US012538071B2

(12) United States Patent
Fukui et al.

(10) Patent No.: US 12,538,071 B2
(45) Date of Patent: Jan. 27, 2026

(54) SPEAKER SYSTEM

(71) Applicant: NTT, Inc., Tokyo (JP)

(72) Inventors: Masahiro Fukui, Tokyo (JP); Kazunori Kobayashi, Tokyo (JP); Noriyoshi Kamado, Tokyo (JP)

(73) Assignee: NTT, Inc., Tokyo (JP)

(*) Notice: Subject to any disclaimer, the term of this patent is extended or adjusted under 35 U.S.C. 154(b) by 256 days.

(21) Appl. No.: 18/029,605

(22) PCT Filed: Nov. 6, 2020

(86) PCT No.: PCT/JP2020/041470
§ 371 (c)(1),
(2) Date: Mar. 30, 2023

(87) PCT Pub. No.: WO2022/097254
PCT Pub. Date: May 12, 2022

(65) Prior Publication Data
US 2023/0370770 A1 Nov. 16, 2023

(51) Int. Cl.
*H04R 1/40* (2006.01)
*H04R 3/12* (2006.01)

(52) U.S. Cl.
CPC ................. *H04R 1/40* (2013.01); *H04R 3/12* (2013.01)

(58) Field of Classification Search
None
See application file for complete search history.

(56) References Cited

U.S. PATENT DOCUMENTS

| | | | | |
|---|---|---|---|---|
| 5,815,579 | A * | 9/1998 | Boyden | H04R 3/12 381/301 |
| 5,887,071 | A * | 3/1999 | House | H04R 5/02 381/87 |
| 8,553,890 | B2 | 10/2013 | Yokota | |
| 10,904,669 | B1 * | 1/2021 | Talakoub | H03G 3/32 |
| 11,974,106 | B2 * | 4/2024 | Lehnert | H04S 3/002 |

(Continued)

FOREIGN PATENT DOCUMENTS

| | | |
|---|---|---|
| EP | 3952331 A1 | 2/2022 |
| JP | H02312395 A | 12/1990 |
| JP | 2003087888 A | 3/2003 |

(Continued)

OTHER PUBLICATIONS

Japan Airlines (2020) "In-flight entertainment/JAL-first class" [online] Accessed on Mar. 10, 2020 Website: URL:https://www.jal.co.jp/jp/ja/inter/service/first/entertainment/index.html with its English version.

*Primary Examiner* — Paul W Huber

(57) ABSTRACT

A sound that cannot be heard by surrounding users is reproduced. A reproduction device (110) includes an n-th reproduction unit that outputs a 2n−1th acoustic signal (n=1, . . . , N) that is an acoustic signal obtained on the basis of a reproduction target and a 2n-th acoustic signal that is an acoustic signal having a phase opposite to that of the 2n−1th acoustic signal. A speaker system (120) includes at least two or more sets of an n-th speaker unit pair (122) including a positive speaker unit (1221) that emits a 2n−1th acoustic signal-based sound and a negative speaker unit (1222) that emits a 2n-th acoustic signal-based sound, the n-th speaker unit pair being installed at a position close to a user's head.

5 Claims, 35 Drawing Sheets

(56) References Cited

U.S. PATENT DOCUMENTS

| | | | | |
|---|---|---|---|---|
| 2014/0023206 | A1 | 1/2014 | Takayasu et al. | |
| 2021/0168504 | A1 * | 6/2021 | Corynen .............. | H04R 1/2826 |

FOREIGN PATENT DOCUMENTS

| | | | |
|---|---|---|---|
| JP | 2006345477 | A | 12/2006 |
| JP | 2012073411 | A | 4/2012 |
| JP | 2014023105 | A | 2/2014 |
| JP | 2017111286 | A | 6/2017 |
| WO | 2020/220735 | A1 | 11/2020 |

* cited by examiner

Condition 2

Condition 3

Condition 4

SPEAKER SYSTEM

CROSS-REFERENCE TO RELATED APPLICATIONS

This application is a U.S. National Stage Application filed under 35 U.S.C. § 371 claiming priority to International Patent Application No. PCT/JP2020/041470, filed on 6 Nov. 2020, the disclosure of which is hereby incorporated herein by reference in its entirety.

TECHNICAL FIELD

The present invention relates to a sound reproduction technology that can be used in an audio system installed in a seat of an aircraft, an automobile, or the like.

BACKGROUND ART

Conventionally, a user uses earphones or headphones to view and listen to movies or music in an aircraft (see Non-Patent Literature 1). This is because when a speaker is used, the reproduced sound reaches the periphery of the user, which causes trouble to other users.

PRIOR ART LITERATURE

Non-Patent Literature

Non Patent Literature 1: In-flight entertainment/JAL-first class, [online], [searched on Mar. 10, 2020], Internet <URL:https://www.jal.co.jp/jp/ja/inter/service/first/entertainment/index.html>

SUMMARY OF THE INVENTION

Problems to be Solved by the Invention

However, wearing earphones or headphones is troublesome for the user. In addition, there are users who do not like wearing due to, for example, disheveling of hair. Some users do not like pressure on their ears due to wearing. Furthermore, wearing earphones or headphones for a long time may make the user feel tired of listening.

In order to eliminate the need to wear earphones or headphones, it is conceivable to synthesize a virtual sound field using a wavefront synthesis technology, but in this case, it is necessary to prepare a large-scale speaker array, which is not realistic.

Therefore, the object of the present invention is to provide a speaker system that reproduces a sound that cannot be heard by surrounding users.

Means to Solve the Problem

An aspect of the present invention is a speaker system that emits an acoustic signal that is audible to a user in the vicinity of a speaker and not audible to a user outside the vicinity of the speaker, the speaker system including: at least two or more sets of speakers, each set including a first speaker that emits the acoustic signal, and a second speaker that emits the acoustic signal in a phase opposite to the first speaker.

Effects of the Invention

According to the present invention, it is possible to reproduce a sound that can be heard only in a very limited narrow range.

DETAILED DESCRIPTION OF THE EMBODIMENTS

Figure 1:
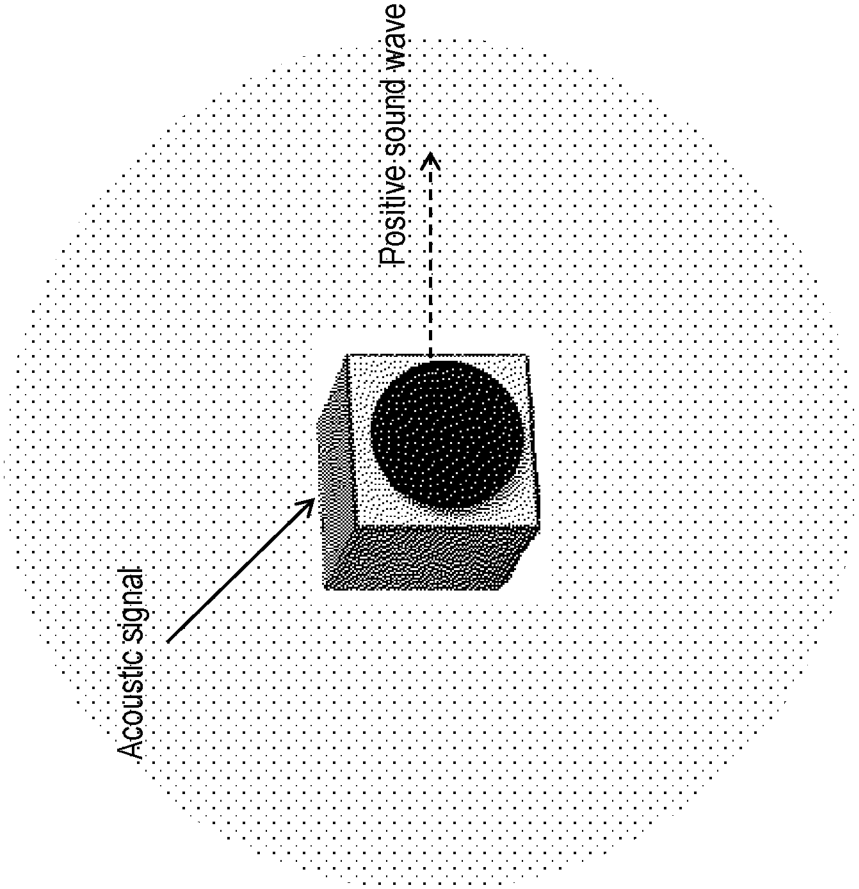
FIG. 1 is a diagram for describing directivity of a sound emitted from a speaker.

Hereinafter, embodiments of the present invention will be described in detail. Note that components having the same functions are denoted by the same reference numerals, and redundant description will be omitted.

Technical Background

First, the directivity of a sound emitted from a speaker will be described. Next, the directivity of a sound emitted from the speaker unit pair of the invention of the present application will be described. Finally, results of experiments for confirming the effects of the speaker unit pair of the invention of the present application will be described.

<<1: Directivity of Sound Emitted from Speaker>>

Typically, a speaker includes a speaker unit and a speaker box. The speaker unit is a component including a diaphragm that converts an acoustic signal, which is an electric signal, into vibration of air (that is, generates a sound wave). In addition, the speaker box is a component that houses the speaker unit.

When the acoustic signal is input to the speaker, the diaphragm of the speaker unit vibrates, and a sound wave is emitted in both directions in which the diaphragm vibrates. Here, a sound wave emitted to the outside of the speaker box (that is, the front direction of the speaker unit) is referred to as a positive sound wave, and a sound wave emitted to the inside of the speaker box (that is, the back direction of the speaker unit) is referred to as a negative sound wave. The negative sound wave is a sound wave having a phase opposite to the phase of the positive sound wave. FIG. 1 is a diagram for describing directivity of a sound emitted from a speaker. As illustrated in FIG. 1, the positive sound wave is emitted from the speaker in all directions, while the negative sound wave does not exit the speaker box. As a result, the sound emitted from the speaker can be heard in a wide range.

<<2: Directivity of Sound Emitted from Speaker Unit Pair>>

Figure 2:
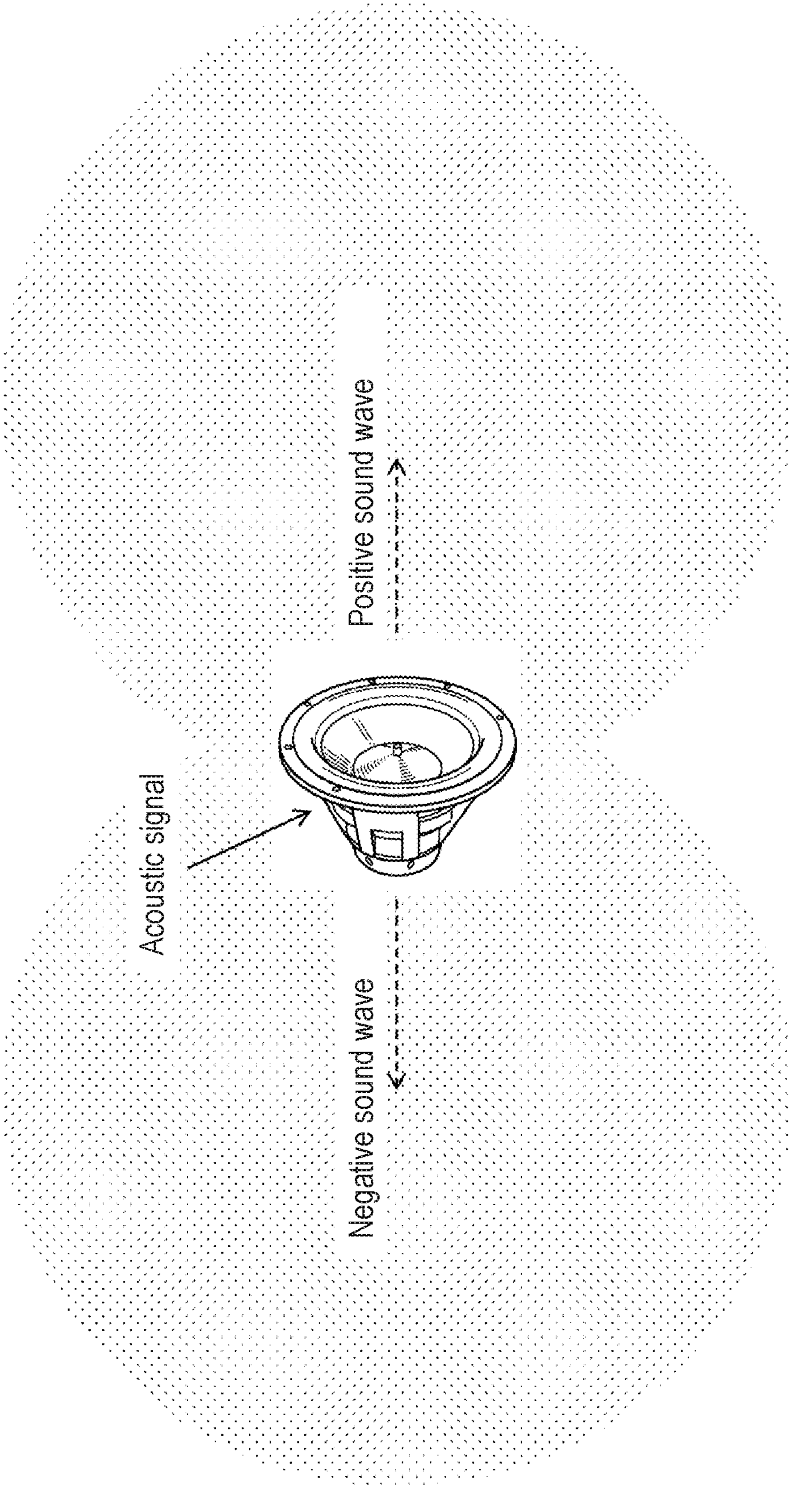
FIG. 2 is a diagram for describing directivity of a sound emitted from a speaker unit.

Here, first, the directivity of a sound emitted from the speaker unit, which is a bare speaker, will be described. FIG. 2 is a diagram for describing directivity of a sound emitted from a speaker unit. In the case of only the speaker unit, a negative sound wave is emitted from the back of the speaker unit hidden in the speaker box, unlike the case of the speaker. Therefore, as illustrated in FIG. 2, the sound emitted from the speaker unit has a characteristic of bidirectivity.

Figure 3:
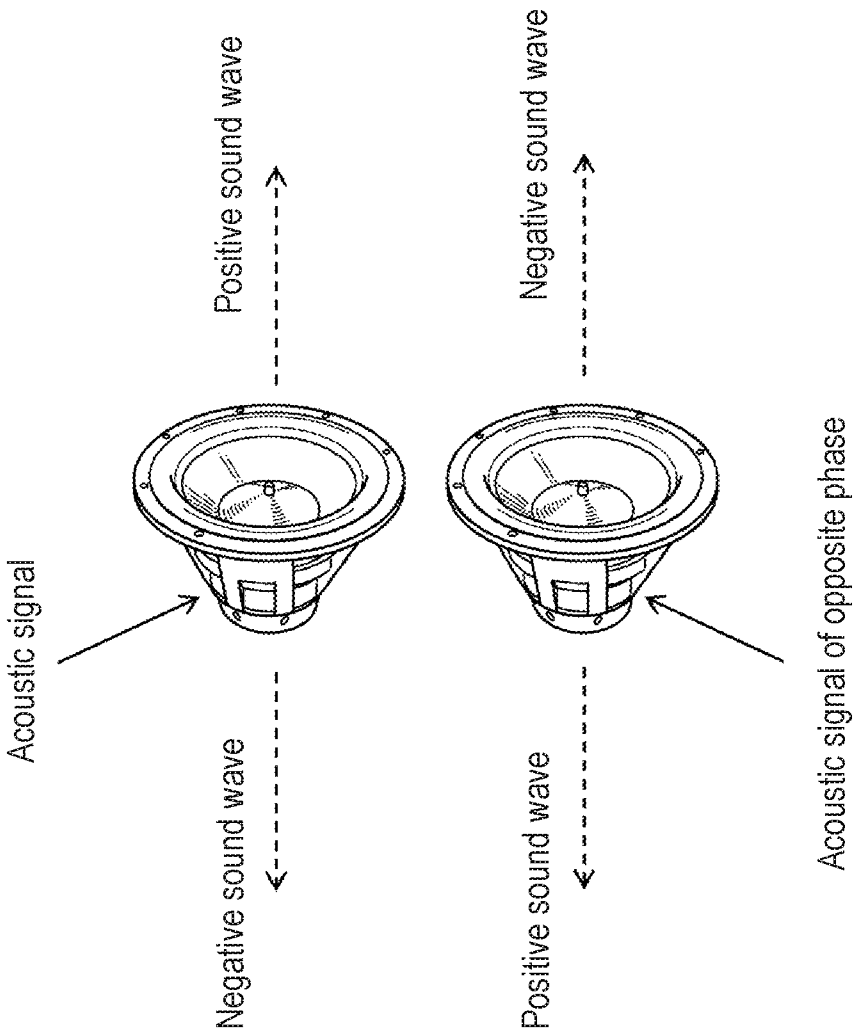
FIG. 3 is a diagram for describing a sound emitted from a speaker unit pair.
Figure 4:
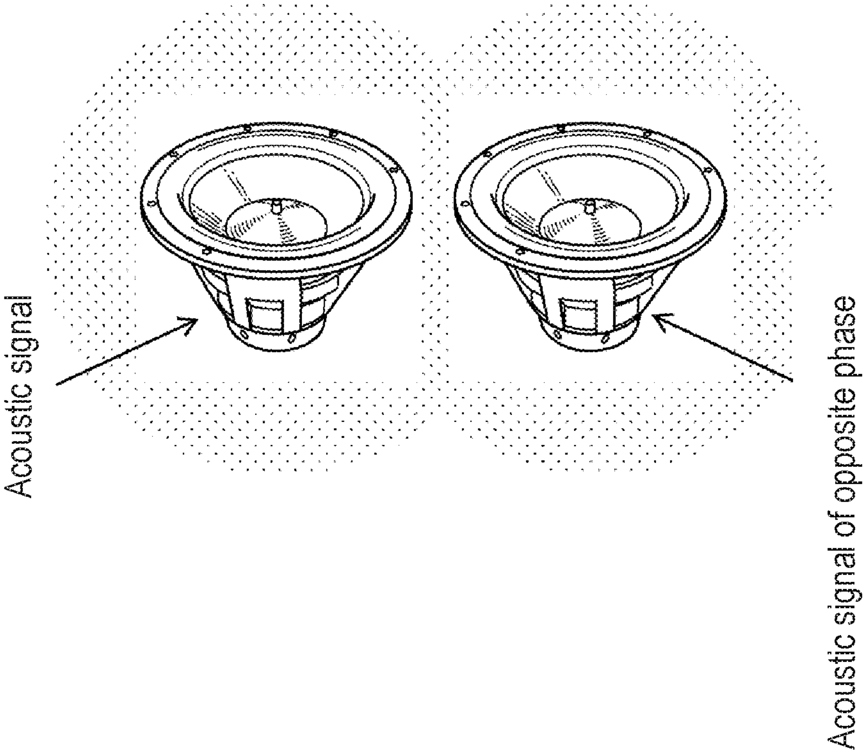
FIG. 4 is a diagram for describing directivity of a sound emitted from a speaker unit pair.

In the invention of the present application, this bidirectivity is used. Hereinafter, a specific description will be given. First, as illustrated in FIG. 3, two speaker units are arranged to form a speaker unit pair. When acoustic signals having opposite positive-negative states are input to the speaker unit pair, the diaphragms of the two speaker units vibrate each and emit sounds based on the two acoustic signals. Then, as illustrated in FIG. 4, a sound in all directions except for the vicinity of the speaker unit pair is erased. That is, the sound is erased only at a position sufficiently away from the speaker unit pair, and the sound is not erased in the vicinity of the speaker unit pair. The reason why the sound is not erased in the vicinity of the speaker unit pair is that the phases of the sound wave emitted from the front of the speaker unit and the sound wave going around from the back do not match in the vicinity of the speaker unit pair.

That is, by utilizing the property that a sound can be heard only in the vicinity of the speaker unit pair when a predetermined acoustic signal is input to one speaker unit constituting the speaker unit pair and an acoustic signal having a phase opposite to that of the predetermined acoustic signal is input to the other speaker unit, it is possible to create a situation in which only the user in the vicinity of the speaker unit pair hears the sound and the other users do not hear the sound.

<<3: Experimental Results>>

Figure 5:
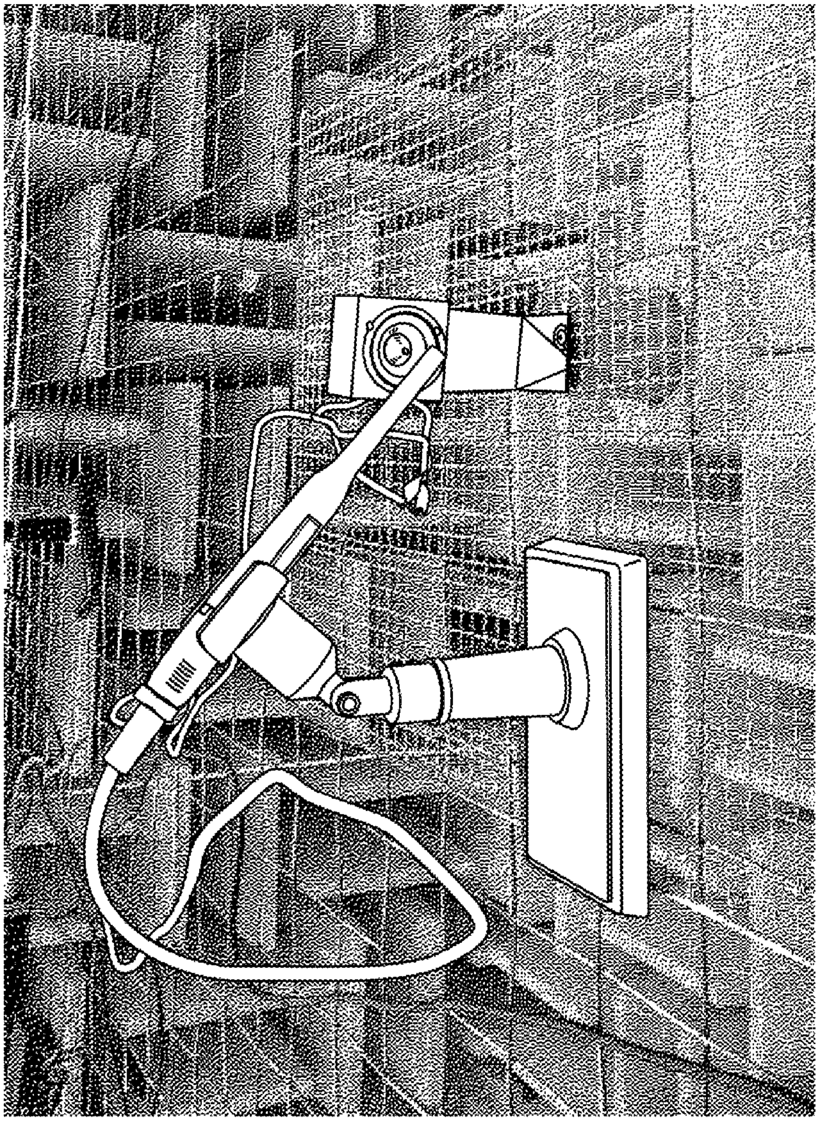
FIG. 5 is a diagram illustrating a state of an experiment (positional relationship between a speaker and a microphone).
Figure 6:
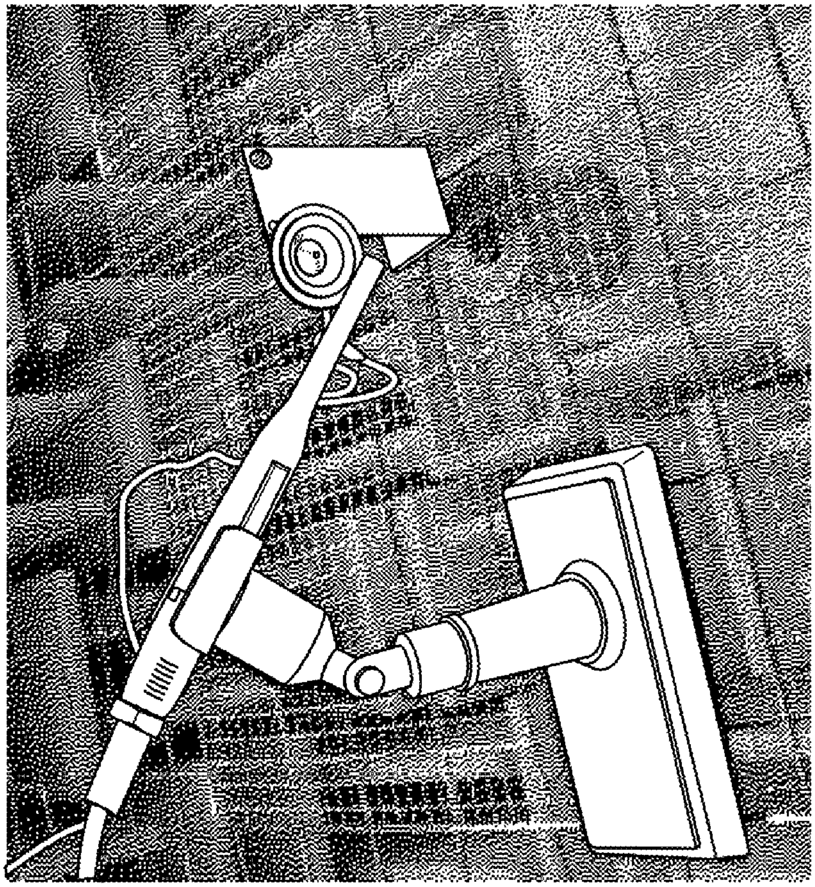
FIG. 6 is a diagram illustrating a state of an experiment (positional relationship between a speaker unit and a microphone).
Figure 7:
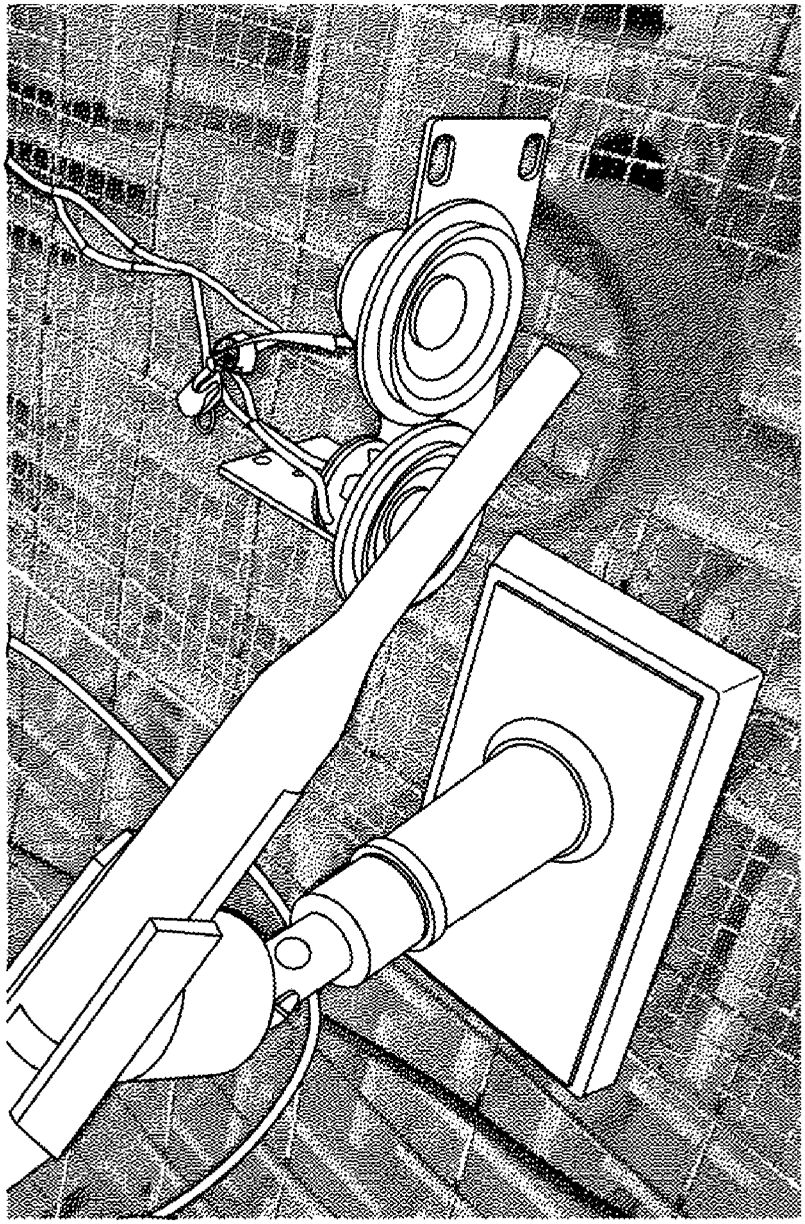
FIG. 7 is a diagram illustrating a state of an experiment (positional relationship between a speaker unit pair and a microphone).

Here, results of experiments on measuring frequency characteristics of a speaker, a speaker unit, and a speaker unit pair will be described. In the experiments, as a speaker, a speaker unit, and a speaker unit pair, a speaker having a diaphragm with a diameter of 4.5 cm (see FIG. 5), a speaker unit obtained by removing the speaker box from the speaker (see FIG. 6), and the two speaker units arranged side by side (see FIG. 7) were used. In addition, in order to measure frequency characteristics in the vicinity of the speaker, the speaker unit, and the speaker unit pair, microphones were installed under four conditions described below.

Figure 8:
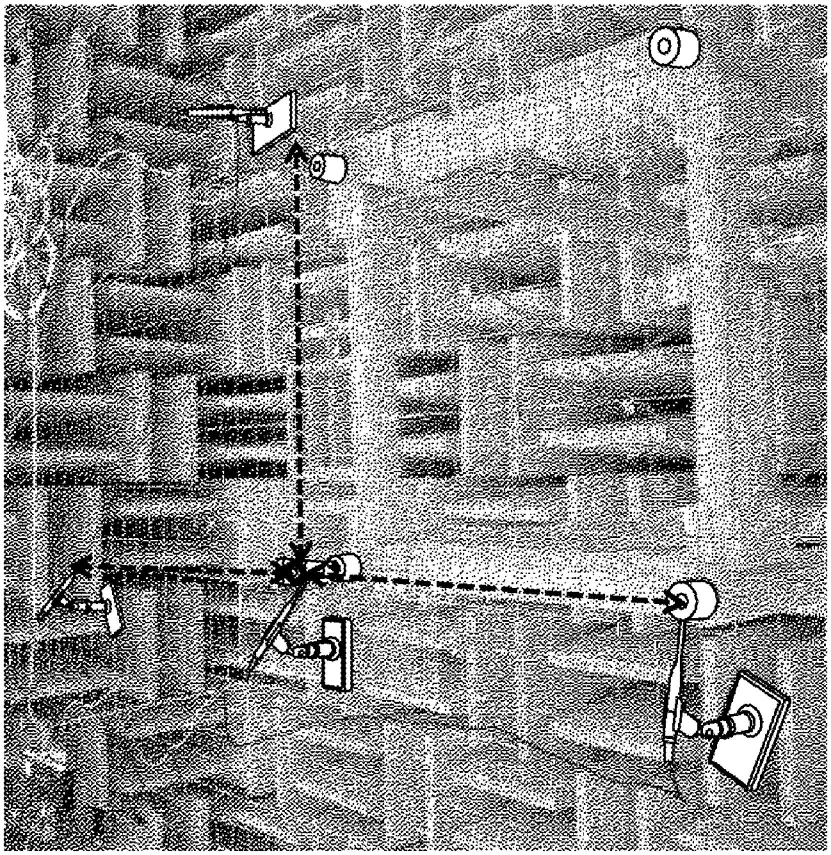
FIG. 8 is a diagram illustrating a state of an experiment (other measurement positions).
Figure 9:
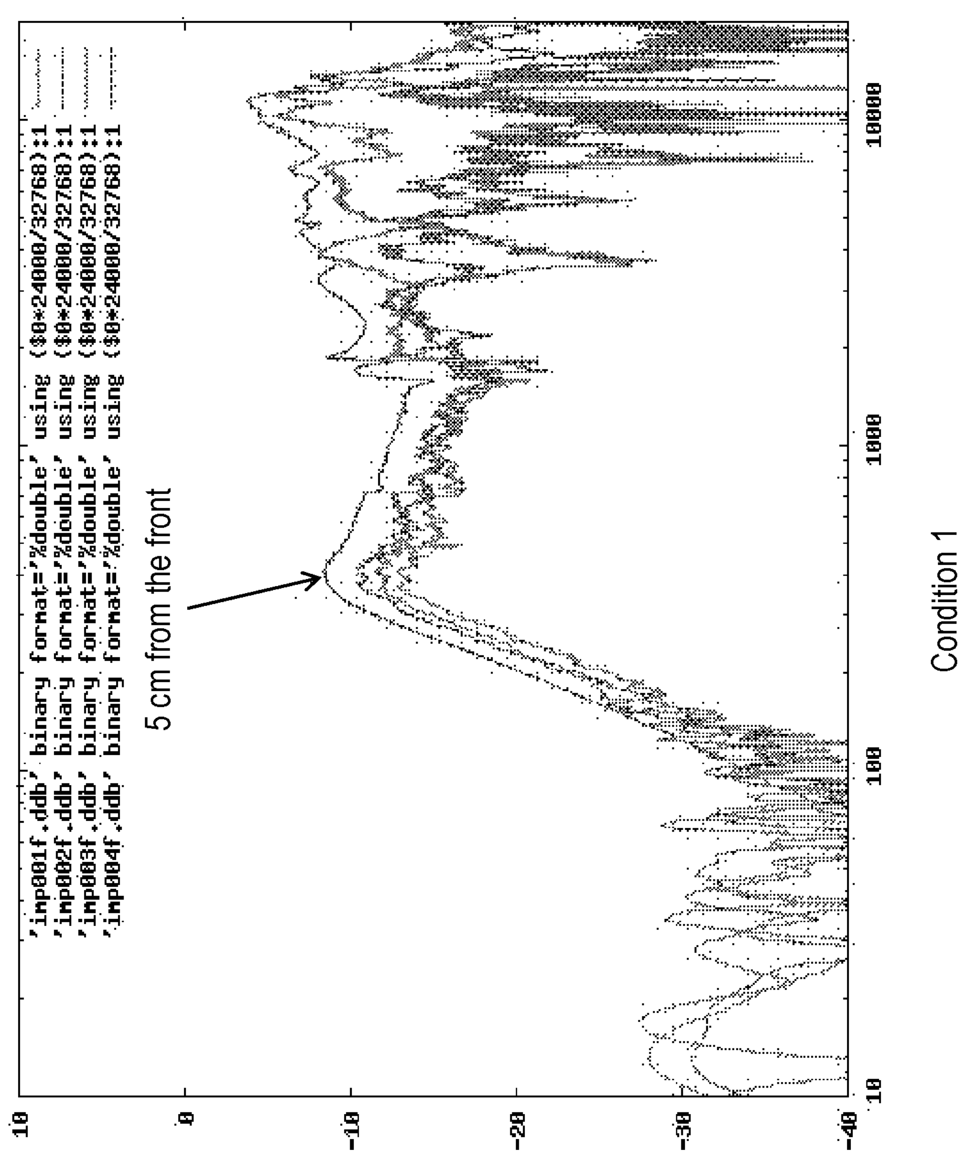
FIG. 9 is a diagram illustrating an experimental result (Condition 1).
Figure 10:
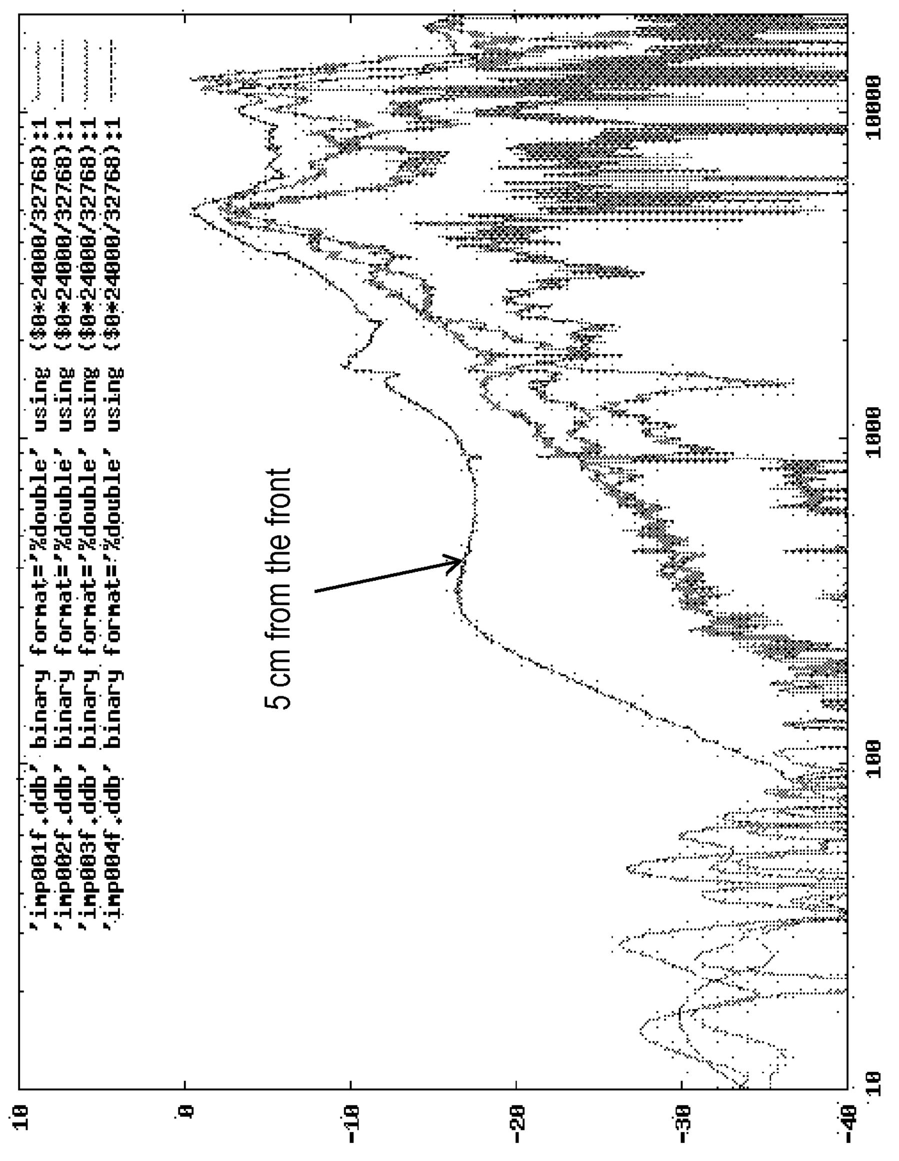
FIG. 10 is a diagram illustrating an experimental result (Condition 2).
Figure 11:
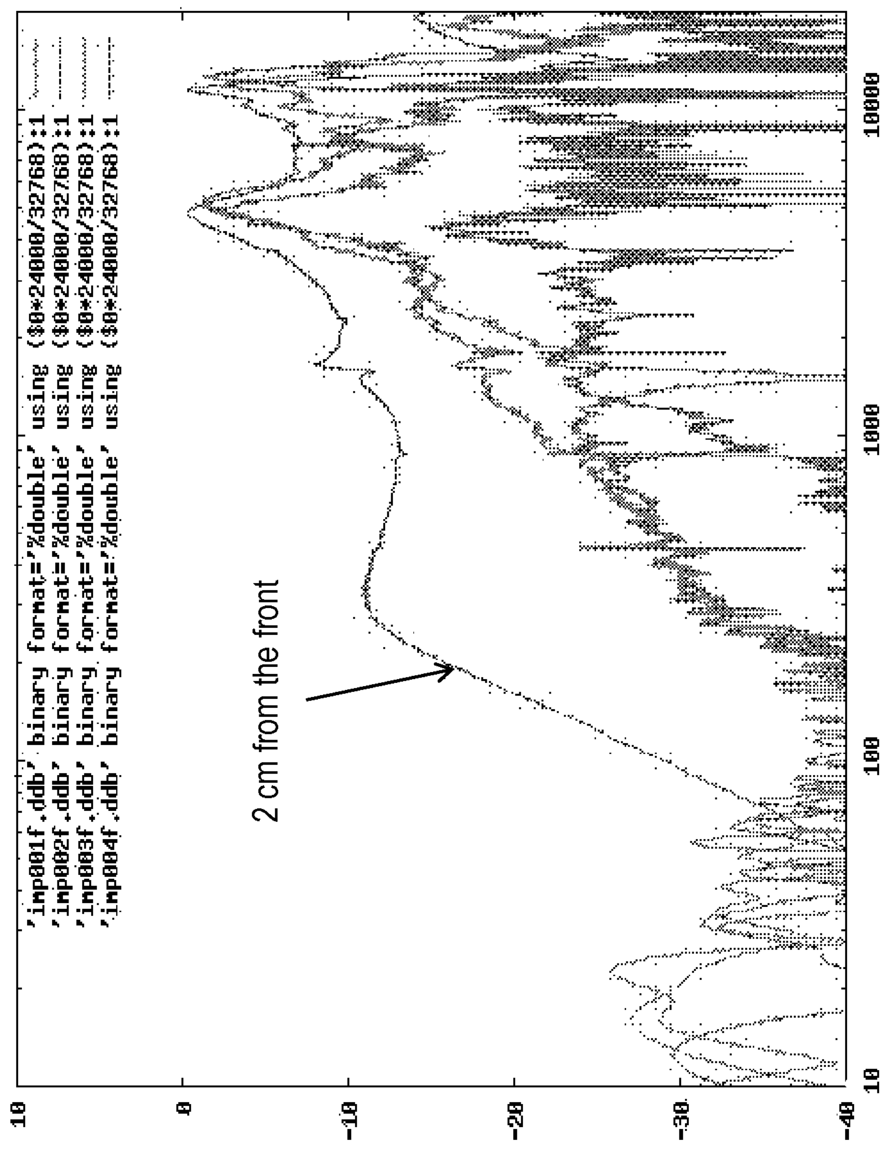
FIG. 11 is a diagram illustrating an experimental result (Condition 3).
Figure 12:
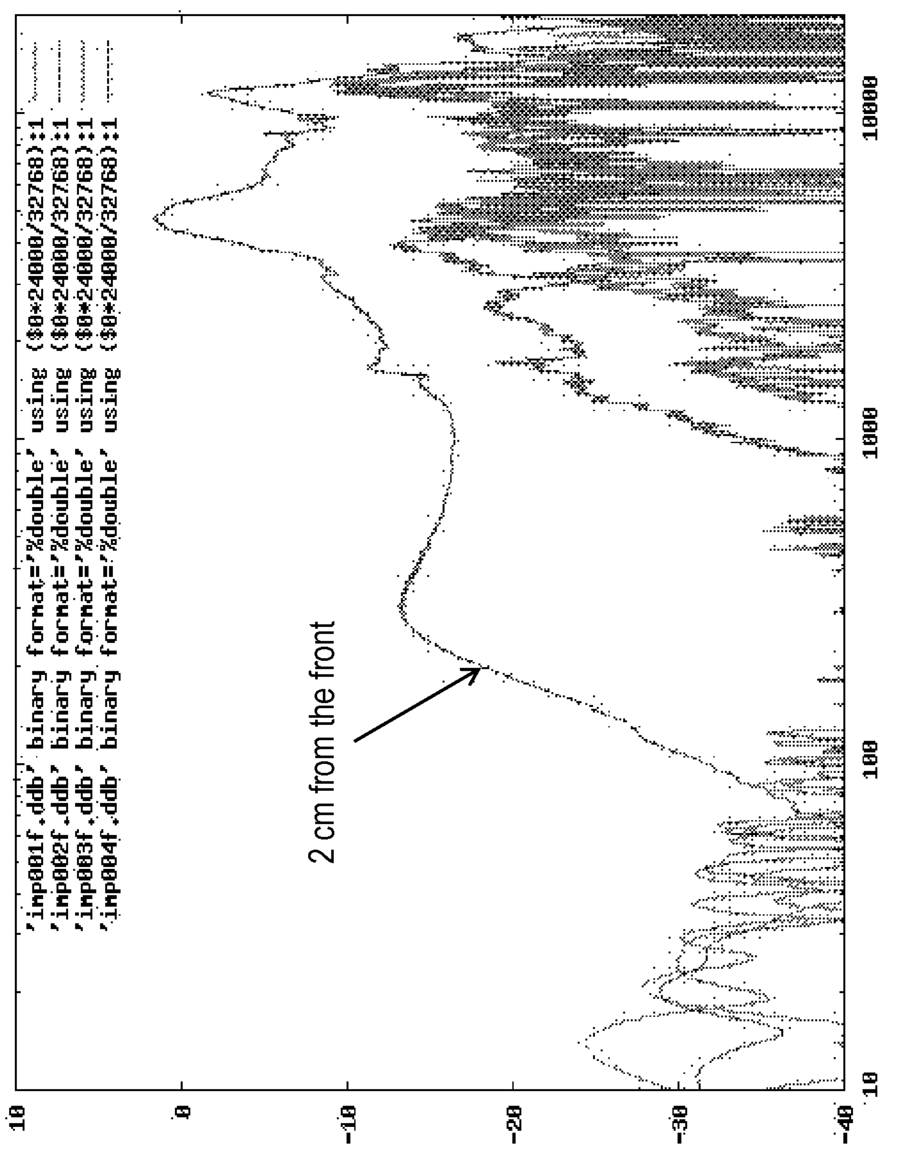
FIG. 12 is a diagram illustrating an experimental result (Condition 4).

(Condition 1) Position of 5 cm from the front of the speaker (Condition 2) Position of 5 cm from the front of the speaker unit (Condition 3) Position of 2 cm from the front of the speaker unit (Condition 4) Position of 2 cm from the front of the speaker unit pair In addition, for comparison under any of the conditions, microphones were also installed at positions of 100 cm from the front, back, and side of the speaker, the speaker unit, and the speaker unit pair (see FIG. 8).

Hereinafter, experimental results will be described. FIGS. 9, 10, 11, and 12 are diagrams illustrating experimental results, and are diagrams illustrating relationships between frequencies and attenuation under Conditions 1, 2, 3, and 4. In each diagram, four curves are illustrated, one curve indicated by an arrow is obtained by collecting a sound with the microphone at the position of 5 cm or 2 cm from the front, and the other three curves are obtained by collecting sounds with the microphones at the position of 100 cm from the front, the back, and the side. Note that the curve at the position of 5 cm or 2 cm from the front is located in the vicinity of the speaker or the like and thus has a very large gain. Therefore, the curve at the position of 5 cm from the front is plotted at −25 dB less than the three curves at the position of 100 cm for the sake of easy viewing. Similarly, the curve at the position of 2 cm from the front is plotted at −32 dB less. Comparing FIG. 9 with FIG. 10, it can be seen that there is almost no difference between the four curves when the speaker is used, whereas there is a difference between the curve at the position of 5 cm from the front and the other three curves when the speaker unit is used. This difference is more remarkable in a lower frequency range. In addition, comparing FIG. 11 with FIG. 12, it can be seen that the speaker unit pair has a larger difference between the curve at the position of 2 cm from the front and the other three curves than the speaker unit.

As described above, it was confirmed from the experiments that the sound emitted from the speaker unit pair of the invention of the present application can be heard only in the vicinity of the speaker unit pair.

First Embodiment

A system that reproduces an acoustic signal obtained on the basis of a reproduction target is referred to as an acoustic system. The acoustic system includes a speaker system for emitting an acoustic signal as a sound (hereinafter, this sound is referred to as an acoustic signal-based sound). Here, the speaker system is a device that converts an acoustic signal that is an analog signal into a sound. In addition, the reproduction target is, for example, data or a signal based on which it is possible to obtain an acoustic signal by predetermined processing, such as data recorded in a CD, a DVD, or a record, data received through the Internet, or a signal received through radio broadcasting or television broadcasting.

Figure 13:
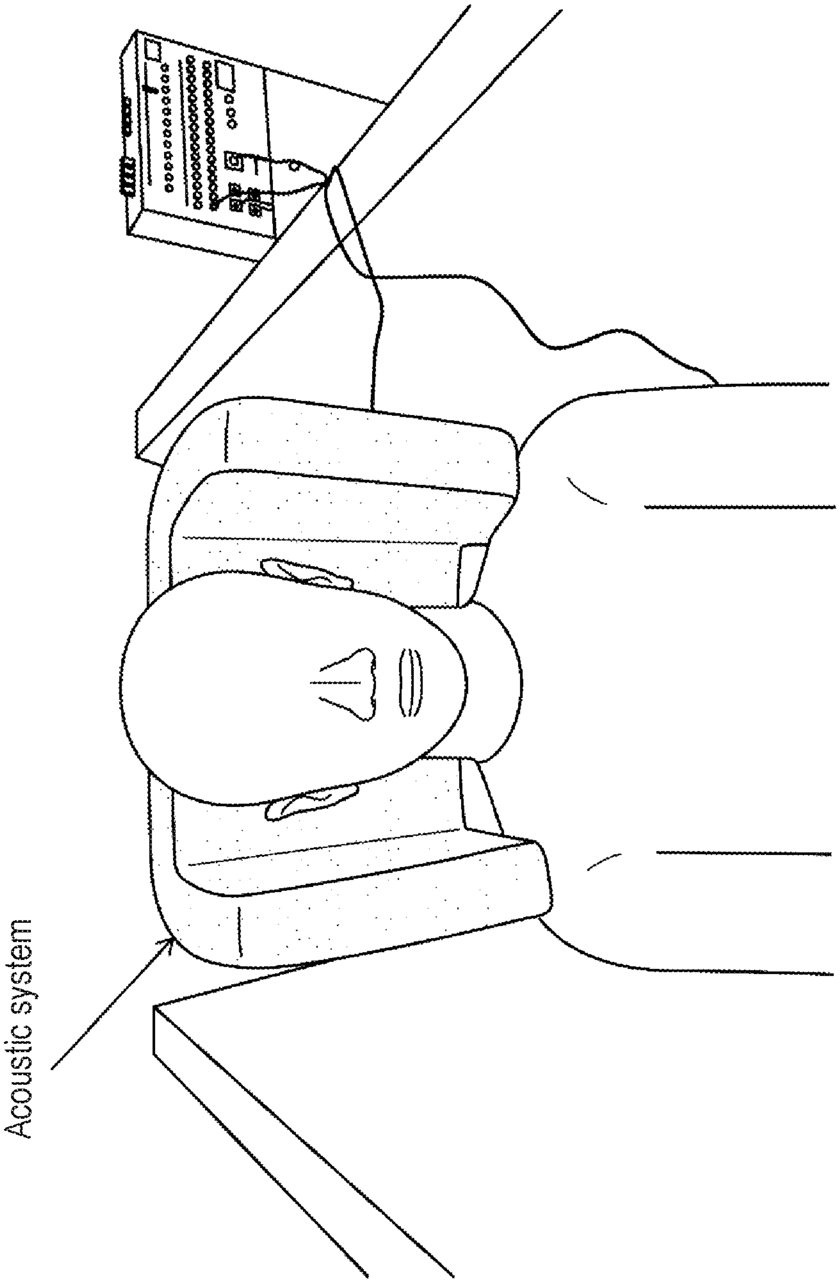
FIG. 13 is a diagram illustrating an example of an acoustic system installed in a seat of an aircraft.

Here, the acoustic system that reproduces an acoustic signal-based sound obtained from a reproduction target so that only a user in the vicinity of the speaker system can hear the sound will be described. That is, the reproduced sound of the acoustic system cannot be heard by users other than the user in the vicinity of the speaker system. When such an acoustic system is used, for example, as an acoustic system for a user who uses a seat of an aircraft, it is possible to provide a system in which only the user who uses the seat can hear the reproduced sound. FIG. 13 is a diagram illustrating an example of an acoustic system installed in a seat of an aircraft. The acoustic system of FIG. 13 is installed in a seat so as to sandwich the head of a user who is seated, and two speaker unit pairs are arranged so as to be near the left and right ears. Note that such an acoustic system can be installed in vehicles other than aircrafts such as automobiles and trains, a reclining chair, and the like, and can also be installed in a wearable form such as being placed on a shoulder. In addition, a driver unit pair including two driver units corresponding to the speaker unit pair described above may be installed in each of the left and right units of headphones or earphones. In general, the headphones are roughly classified into an open-type (open-air) and a closed-type (closed-back). If the above technique is applied particularly to an open-type in which there is a concern of sound leakage, it is expected that the sound leakage will be reduced.

Figure 14:
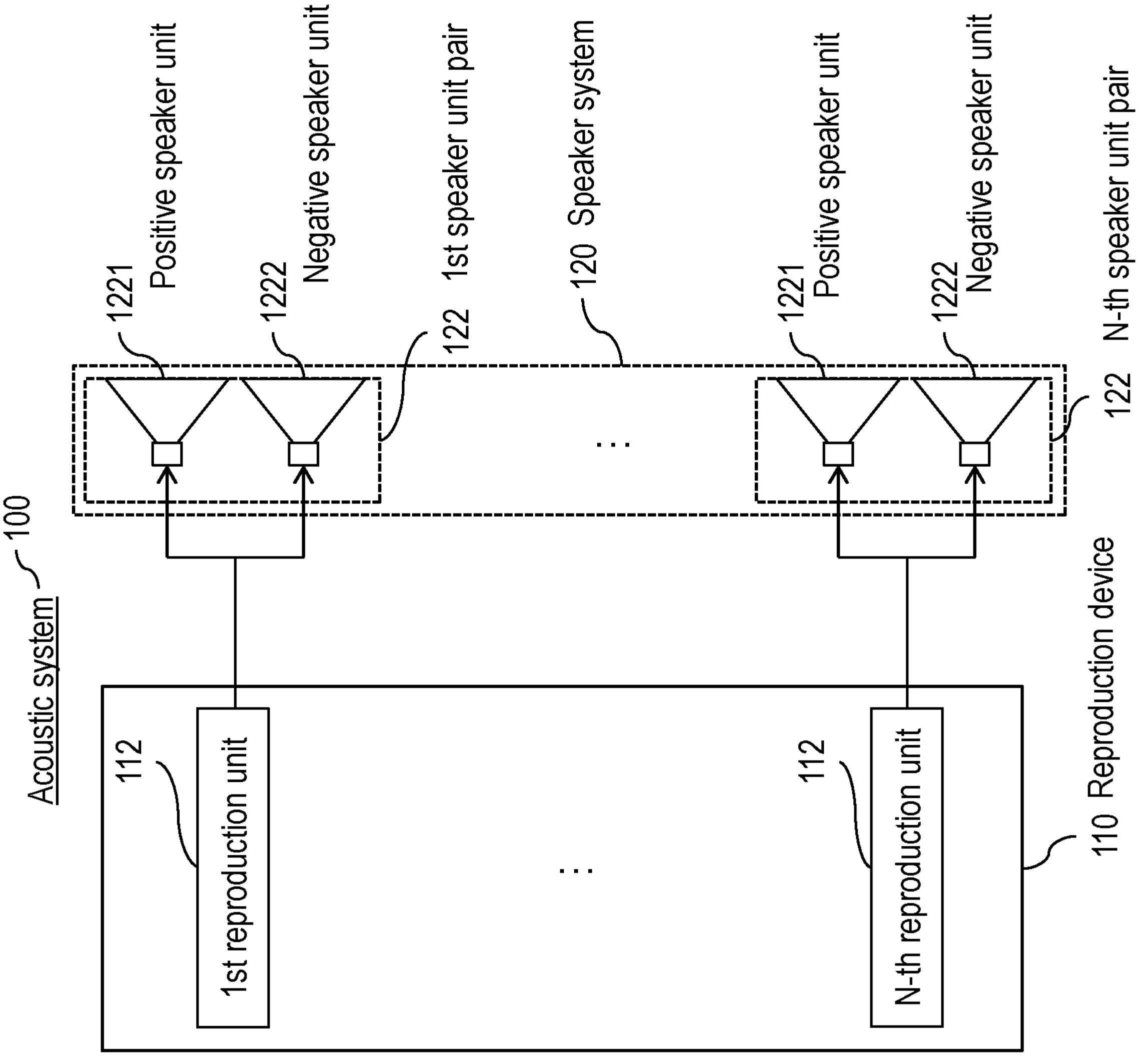
FIG. 14 is a block diagram illustrating an example of a configuration of an acoustic system 100.

Hereinafter, the acoustic system 100 will be described with reference to FIG. 14. FIG. 14 is a block diagram illustrating a configuration of the acoustic system 100. As illustrated in FIG. 14, the acoustic system 100 includes a reproduction device 110 and a speaker system 120. The reproduction device 110 includes N (where N is an integer of 1 or more) reproduction units 112 (that is, a first reproduction unit 112, . . . , and an N-th reproduction unit 112). In addition, the speaker system 120 includes N speaker unit pairs 122 (that is, a first speaker unit pair 122, . . . , and an N-th speaker unit pair 122). The speaker unit pair 122 includes two speaker units (that is, a positive speaker unit 1221 and a negative speaker unit 1222). An acoustic signal having a phase opposite to that of the acoustic signal input to the positive speaker unit 1221 is input to the negative speaker unit 1222. The speaker system 120 is installed at a position close to the head of the user who uses the seat.

Note that a direction in which an n-th speaker unit pair 122 faces the user is referred to as n-th user direction (n=1, . . . , N), and the positive speaker unit 1221 and the negative speaker unit 1222 of the n-th speaker unit pair 122 (n=1, . . . , N) are arranged such that a sound emitted from the positive speaker unit 1221 in a direction opposite to the n-th user direction and a sound emitted from the negative speaker unit 1222 in a direction opposite to the n-th user direction go around and propagate in the n-th user direction. Here, the n-th user direction is a front direction of the positive speaker unit 1221 and the negative speaker unit 1222 of the n-th speaker unit pair 122. In addition, the direction opposite to the n-th user direction is a back direction of the positive speaker unit 1221 and the negative speaker unit 1222 of the n-th speaker unit pair 122.

In addition, the positive speaker unit 1221 and the negative speaker unit 1222 of the n-th speaker unit pair 122 (n=1, . . . , N) are arranged in a positional relationship in which the sound emitted from the positive speaker unit 1221 and the sound emitted from the negative speaker unit 1222 are mutually erased so as not to be heard by a user who uses another seat.

Hereinafter, an operation of the acoustic system 100 will be described with reference to FIG. 14.

The reproduction device 110 receives, as input, a first acoustic signal, a third acoustic signal, . . . , and a 2N−1th acoustic signal, which are acoustic signals obtained on the basis of the reproduction target, and outputs the first acoustic signal, a second acoustic signal, . . . , and a 2N-th acoustic signal. More specifically, the n-th reproduction unit 112 (n=1, . . . , N) receives, as input, a 2n−1th acoustic signal, generates a 2n-th acoustic signal, which is an acoustic signal having a phase opposite to that of the 2n−1th acoustic signal from the 2n−1th acoustic signal, and outputs the 2n−1th acoustic signal and the 2n-th acoustic signal. The 2n−1th acoustic signal and the 2n-th acoustic signal are input to the positive speaker unit 1221 and the negative speaker unit 1222 of the n-th speaker unit pair 122, respectively.

The speaker system 120 receives, as input, the first acoustic signal, the second acoustic signal, . . . , and the 2N-th acoustic signal output from the reproduction device 110, and emits a first acoustic signal-based sound, a second acoustic signal-based sound, . . . , and a 2N-th acoustic signal-based sound. More specifically, the n-th speaker unit pair 122 (n=1, . . . , N) receives, as input, the 2n−1th acoustic signal and the 2n-th acoustic signal, emits a 2n−1th acoustic signal-based sound from the positive speaker unit 1221, and emits a 2n-th acoustic signal-based sound from the negative speaker unit 1222. Since the 2n−1th acoustic signal and the 2n-th acoustic signal have a mutually opposite phase relationship, the sound can be heard only in the vicinity of the seat where the speaker system 120 is installed as described in <Technical background>. For example, in the case of N=2, when the first acoustic signal and the third acoustic signal are respectively a right-channel acoustic signal and a left-channel acoustic signal of a certain sound source, a stereo sound can be heard only in the vicinity of the seat where the speaker system 120 is installed.

Note that the sound emitted from the positive speaker unit 1221 of the n-th speaker unit pair 122 in the n-th user direction and the sound emitted from the positive speaker unit 1221 of the n-th speaker unit pair 122 in the direction opposite to the n-th user direction have a mutually opposite phase relationship. Similarly, the sound emitted from the negative speaker unit 1222 of the n-th speaker unit pair 122 in the n-th user direction and the sound emitted from the negative speaker unit 1222 of the n-th speaker unit pair 122 in the direction opposite to the n-th user direction have a mutually opposite phase relationship.

According to the embodiment of the present invention, it is possible to reproduce a sound that can be heard only in a very limited narrow range such as the vicinity of the speaker system.

Second Embodiment

In the acoustic system 100 of the first embodiment, a range in which an emitted sound can be heard, that is, a so-called sweet spot is narrow. Here, an acoustic system having a structure for enlarging the sweet spot will be described.

Figure 15:
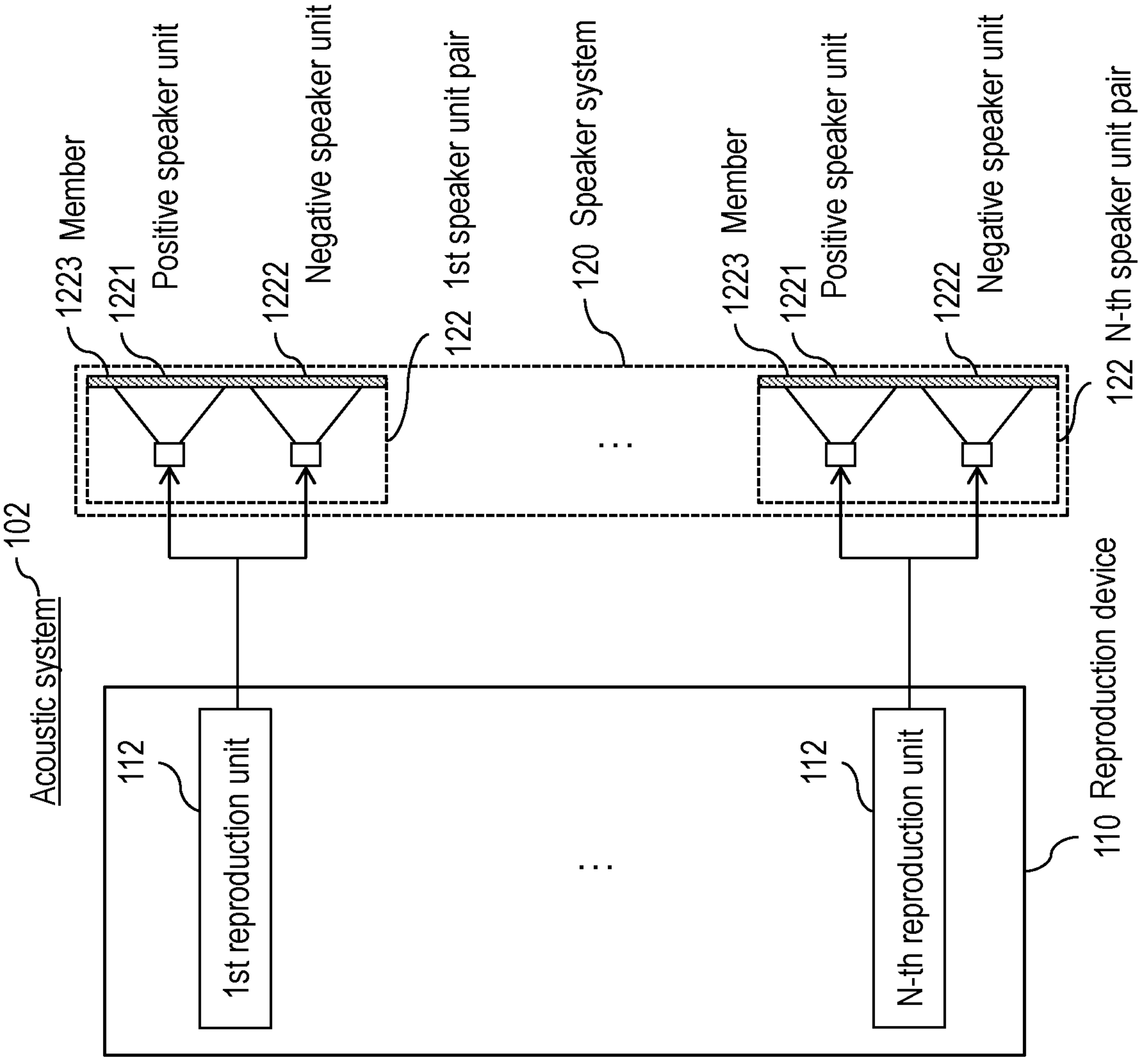
FIG. 15 is a block diagram illustrating an example of a configuration of an acoustic system 102.

Hereinafter, the acoustic system 102 will be described with reference to FIG. 15. FIG. 15 is a block diagram illustrating a configuration of the acoustic system 102. As illustrated in FIG. 15, similarly to the acoustic system 100, the acoustic system 102 includes a reproduction device 110 and a speaker system 120. However, the acoustic system 102 differs from the acoustic system 100 in that the member 1223 is attached to the speaker unit pair 122.

Hereinafter, the structure of the n-th speaker unit pair 122 (n=1, . . . , N) will be described with reference to FIG. 15.

Figure 16:
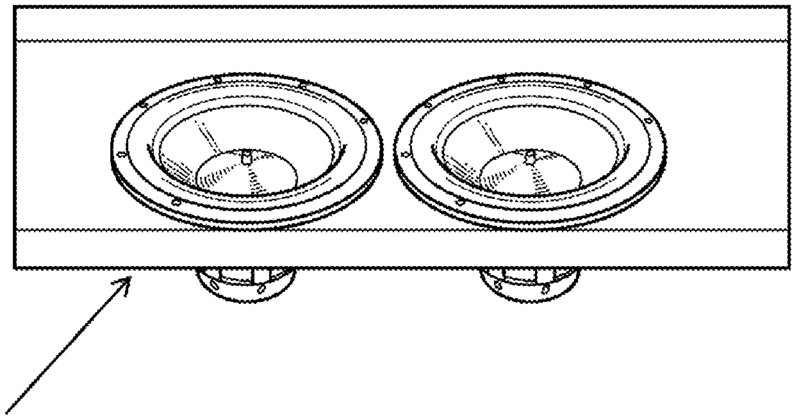
FIG. 16 is a diagram illustrating an example of a configuration of a speaker unit pair 122 to which a member 1223 is attached.

The member 1223 is attached to the n-th speaker unit pair 122 in order to lengthen a sound path in which a sound emitted from the positive speaker unit 1221 and the negative speaker unit 1222 of the n-th speaker unit pair 122 in the direction opposite to the n-th user direction goes around in the user direction (see FIG. 16). The member 1223 may be, for example, a member such as a partition plate that prevents a sound from going around from the back of the speaker unit. The member 1223 is attached not to prevent a sound from going around, but to increase the phase difference between a sound going around from the back and a sound from the front, that is, to lengthen the path of the sound going around.

The n-th speaker unit pair 122 to which the member 1223 is attached has a larger sweet spot than the n-th speaker unit pair 122 of the first embodiment.

According to the embodiment of the present invention, it is possible to reproduce a sound that can be heard only in a very limited narrow range such as the vicinity of the speaker system.

Third Embodiment

Since a sound in a high frequency range has a short wavelength, it is difficult for the phases of a sound going around from the back and a sound from the front to match. Therefore, a sound in a high frequency range has the feature that it is less likely to be erased both in the vicinity of a speaker unit and in a relatively distant place other than the vicinity as compared with a sound in a low frequency range. Since none of the positive speaker unit 1221 and the negative speaker unit 1222 of the speaker unit pair 122 constituting the acoustic system 100 of the first embodiment is housed in the speaker box, the range in which the sound in a high frequency range can be heard is wide due to the above feature, and sound leakage may occur. Therefore, here, an acoustic system having a structure in which a sound in a high frequency range is less likely to leak out of the vicinity of the speaker system will be described.

Figure 17:
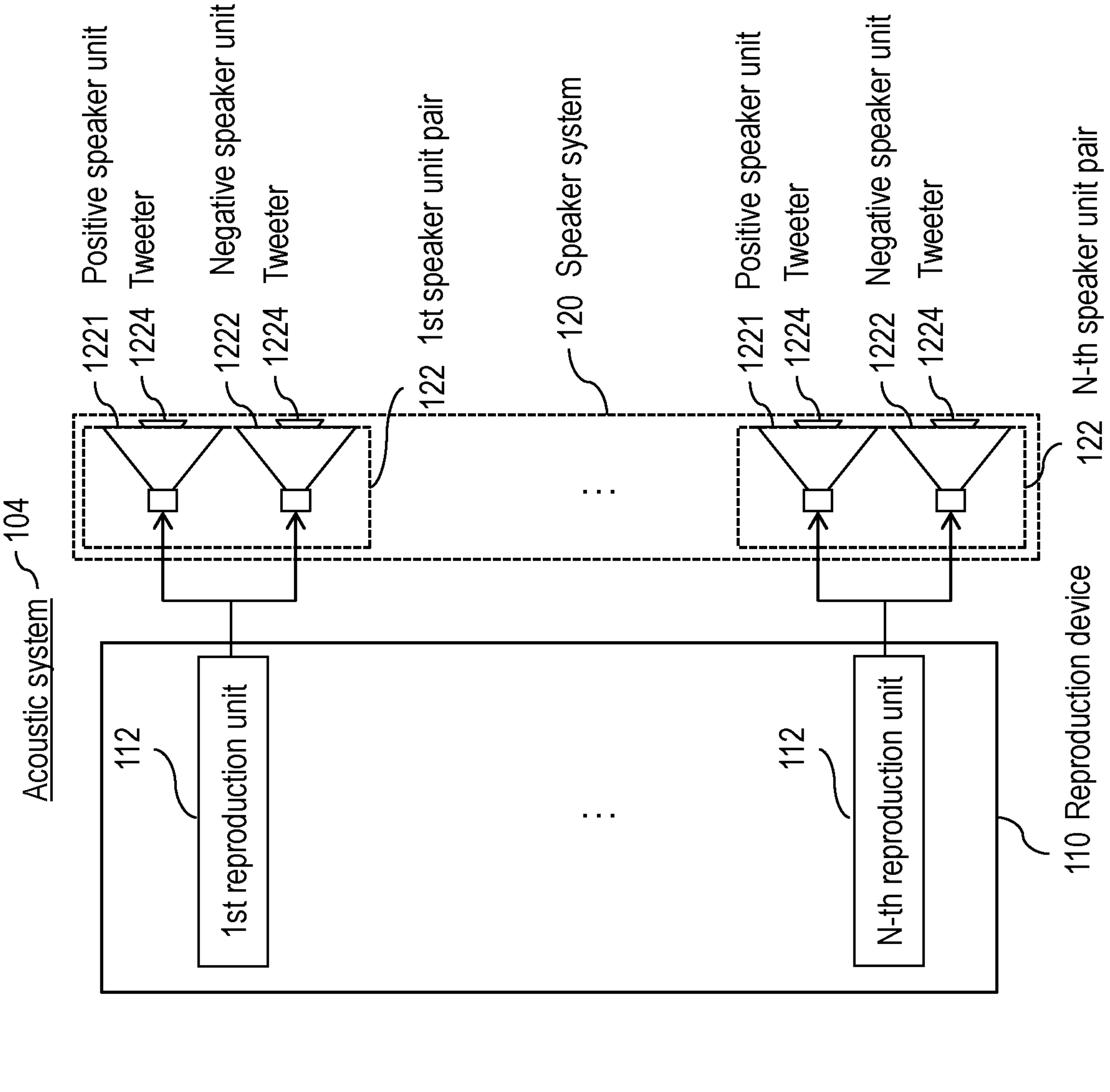
FIG. 17 is a block diagram illustrating an example of a configuration of an acoustic system 104.

Hereinafter, the acoustic system 104 will be described with reference to FIG. 17. FIG. 17 is a block diagram illustrating a configuration of the acoustic system 104. As illustrated in FIG. 17, similarly to the acoustic system 100, the acoustic system 104 includes the reproduction device 110 and the speaker system 120. However, the acoustic system 104 differs from the acoustic system 100 in that a tweeter 1224 is attached to each of the positive speaker unit 1221 and the negative speaker unit 1222 of the speaker unit pair 122. Here, the tweeter is a speaker unit for reproducing a signal in a high frequency range. Note that it is assumed that the tweeter 1224 is attached to the positive speaker unit 1221 and the negative speaker unit 1222 so as not to leak a sound from the back as if they are housed in the speaker box.

Hereinafter, an operation of the speaker system 120 will be described with reference to FIG. 17.

The speaker system 120 receives, as input, the first acoustic signal, the second acoustic signal, . . . , and the 2N-th acoustic signal output from the reproduction device 110, and emits a first acoustic signal-based sound, a second acoustic signal-based sound, . . . , and a 2N-th acoustic signal-based sound. More specifically, the n-th speaker unit pair 122 (n=1, . . . , N) receives, as input, the 2n−1th acoustic signal and the 2n-th acoustic signal, emits a 2n−1th acoustic signal-based sound from the positive speaker unit 1221 and the tweeter 1224 attached to the positive speaker unit 1221, and emits a 2n-th acoustic signal-based sound from the negative speaker unit 1222 and the tweeter 1224 attached to the negative speaker unit 1222.

A sound in a high frequency range has a property of higher straightness, but since the sound from the back of the tweeter 1224 does not leak, it is possible to prevent the sound in a high frequency range emitted from tweeter 1224 from leaking in all directions.

According to the embodiment of the present invention, it is possible to reproduce a sound that can be heard only in a very limited narrow range such as the vicinity of the speaker system.

Fourth Embodiment

The tweeter is a speaker unit for reproducing a signal in a high frequency range. Therefore, only a signal in a high frequency range may be input to the tweeter by band division processing. Therefore, here, an acoustic system that performs band division processing will be described.

Figure 18:
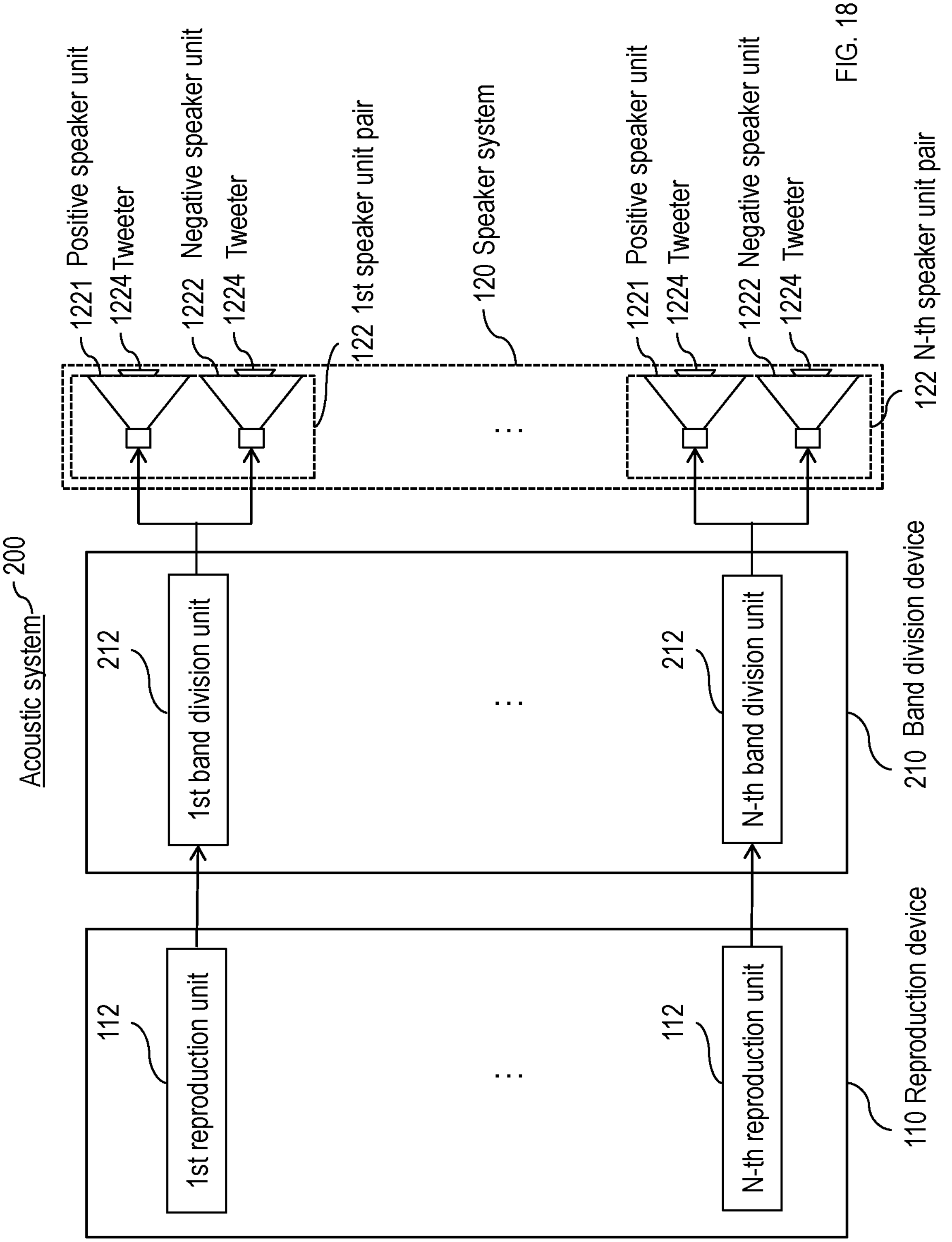
FIG. 18 is a block diagram illustrating an example of a configuration of an acoustic system 200.

Hereinafter, the acoustic system 200 will be described with reference to FIG. 18. FIG. 18 is a block diagram illustrating a configuration of the acoustic system 200. As illustrated in FIG. 18, the acoustic system 200 includes the reproduction device 110, a band division device 210, and the speaker system 120. The band division device 210 includes N band division units 212 (that is, a first band division unit 212, . . . , and an N-th band division unit 212). The acoustic system 200 differs from the acoustic system 104 in that it includes the band division device 210.

Hereinafter, an operation of the band division device 210 and the speaker system 120 will be described with reference to FIG. 18.

The band division device 210 receives, as input, a first acoustic signal, a second acoustic signal, . . . , and a 2N-th acoustic signal output from the reproduction device 110, and outputs a first high frequency range signal that is a high frequency range signal of the first acoustic signal and a first low frequency range signal that is a low frequency range signal of the first acoustic signal, a second high frequency range signal that is a high frequency range signal of the second acoustic signal and a second low frequency range signal that is a low frequency range signal of the second acoustic signal, . . . , and a 2N-th high frequency range signal that is a high frequency range signal of the 2N-th acoustic signal and a 2N-th low frequency range signal that is a low frequency range signal of the 2N-th acoustic signal. More specifically, an n-th band division unit 212 (n=1, . . . , N) receives, as input, a 2n−1th acoustic signal and a 2n-th acoustic signal, generates a 2n−1th high frequency range signal that is a high frequency range signal of the 2n−1th acoustic signal and a 2n−1th low frequency range signal that is a low frequency range signal of the 2n−1th acoustic signal, generates a 2n-th high frequency range signal that is a high frequency range signal of the 2n-th acoustic signal and a 2n-th low frequency range signal that is a low frequency range signal of the 2n-th acoustic signal, and outputs the 2n−1th high frequency range signal, the 2n−1th low frequency range signal, the 2n-th high frequency range signal, and the 2n-th low frequency range signal.

The speaker system 120 receives, as input, the first high frequency range signal, the first low frequency range signal, the second high frequency range signal, the second low frequency range signal, . . . , the 2N-th high frequency range signal, and the 2N-th low frequency range signal output from the band division device 210, and emits a first high frequency range signal-based sound, a first low frequency range signal-based sound, a second high frequency range signal-based sound, a second low frequency range signal-based sound, . . . , a 2N-th high frequency range signal-based sound, and a 2N-th low frequency range signal-based sound. More specifically, the n-th speaker unit pair 122 (n=1, . . . , N) receives, as input, the 2n−1th high frequency range signal, the 2n−1th low frequency range signal, the 2n-th high frequency range signal, and the 2n-th low frequency range signal, emits a 2n−1th low frequency range signal-based sound and a 2n−1th high frequency range signal-based sound from the positive speaker unit 1221 and the tweeter 1224 attached to the positive speaker unit 1221, respectively, and emits a 2n-th low frequency range signal-based sound and a 2n-th high frequency range signal-based sound from the negative speaker unit 1222 and the tweeter 1224 attached to the negative speaker unit 1222, respectively.

According to the embodiment of the present invention, it is possible to reproduce a sound that can be heard only in a very limited narrow range such as the vicinity of the speaker system.

Fifth Embodiment

In the acoustic system 200 of the fourth embodiment, the speaker unit in which the tweeters 1224 are attached to the positive speaker unit 1221 and the negative speaker unit 1222 is used. Here, an acoustic system using a speaker unit pair including two speaker units and one tweeter instead of using a speaker unit pair including two speaker units to which tweeters are attached will be described.

Figure 19:
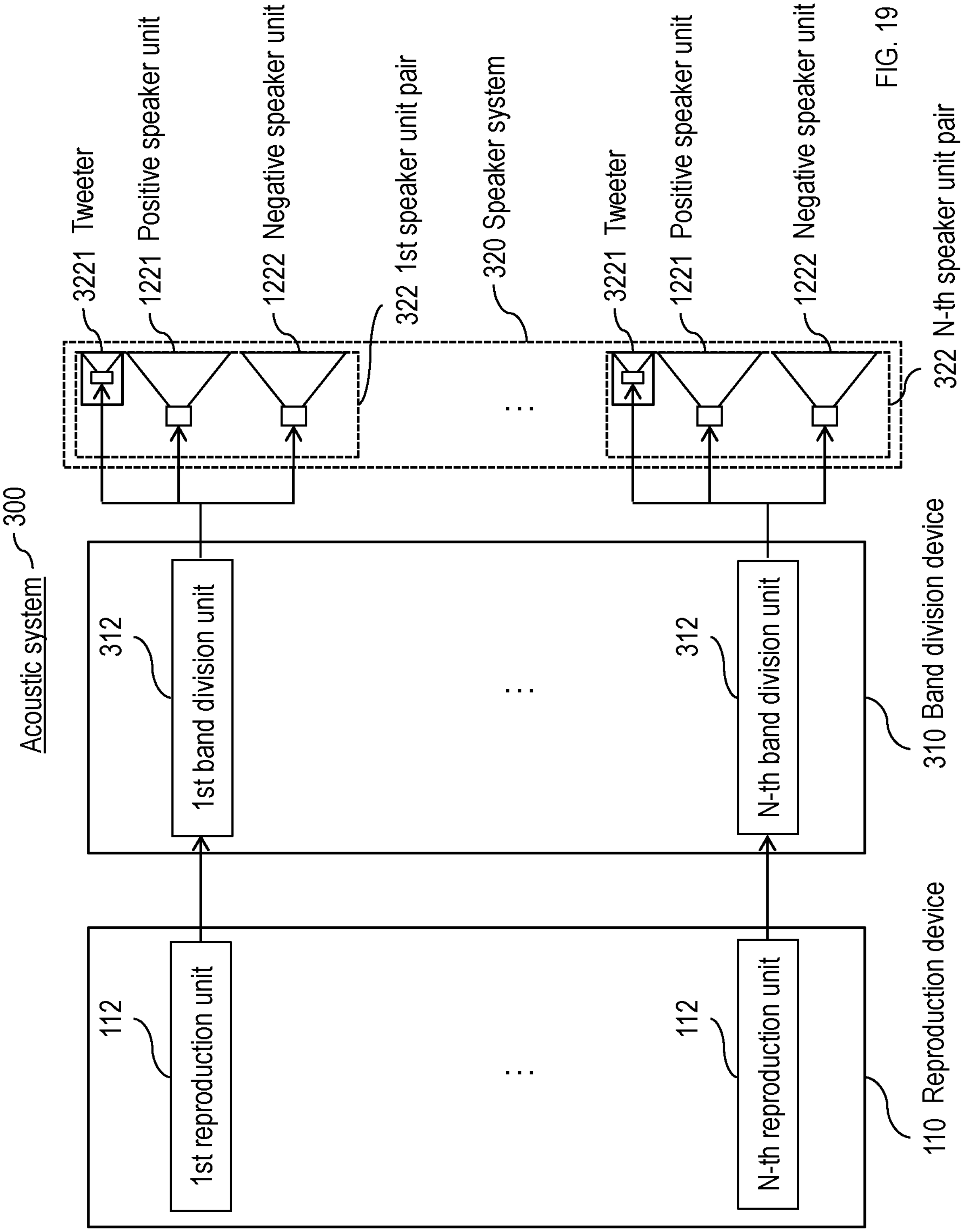
FIG. 19 is a block diagram illustrating an example of a configuration of an acoustic system 300.

Hereinafter, the acoustic system 300 will be described with reference to FIG. 19. FIG. 19 is a block diagram illustrating a configuration of the acoustic system 300. As illustrated in FIG. 19, the acoustic system 300 includes the reproduction device 110, a band division device 310, and a speaker system 320. The band division device 310 includes N band division units 312 (that is, a first band division unit 312, . . . , and an N-th band division unit 312). In addition, the speaker system 320 includes N speaker unit pairs 322 (that is, a first speaker unit pair 322, . . . , and an N-th speaker unit pair 322). The speaker unit pair 322 includes two speaker units (that is, a positive speaker unit 1221 and a negative speaker unit 1222), and a tweeter 3221. The acoustic system 300 differs from the acoustic system 200 in that it includes the band division device 310 and the speaker system 320 instead of the band division device 210 and the speaker system 120.

The tweeter 3221 is preferably housed in the speaker box so as not to leak a sound from the back. In addition, the speaker system 320 is installed at a position close to the head of the user who uses the seat.

Note that a direction in which the n-th speaker unit pair 322 faces the user is referred to as n-th user direction (n=1, . . . , N), and the positive speaker unit 1221 and the negative speaker unit 1222 of the n-th speaker unit pair 322 (n=1, . . . , N) are arranged such that a sound emitted from the positive speaker unit 1221 in a direction opposite to the n-th user direction and a sound emitted from the negative speaker unit 1222 in a direction opposite to the n-th user direction go around and propagate in the n-th user direction. Here, the n-th user direction is a front direction of the positive speaker unit 1221, the negative speaker unit 1222, and the tweeter 3221 of the n-th speaker unit pair 322. In addition, the direction opposite to the n-th user direction is a back direction of the positive speaker unit 1221, the negative speaker unit 1222, and the tweeter 3221 of the n-th speaker unit pair 322.

In addition, the positive speaker unit 1221 and the negative speaker unit 1222 of the n-th speaker unit pair 322 (n=1, . . . , N) are arranged in a positional relationship in which the sound emitted from the positive speaker unit 1221 and the sound emitted from the negative speaker unit 1222 are mutually erased so as not to be heard by a user who uses another seat.

Hereinafter, an operation of the band division device 310 and the speaker system 320 will be described with reference to FIG. 19.

The band division device 310 receives, as input, a first acoustic signal, a second acoustic signal, . . . , and a 2N-th acoustic signal output from the reproduction device 110, and outputs a first high frequency range signal that is a high frequency range signal of the first acoustic signal and a first low frequency range signal that is a low frequency range signal of the first acoustic signal, a second low frequency range signal that is a low frequency range signal of the second acoustic signal, . . . , a 2N−1th high frequency range signal that is a high frequency range signal of the 2N−1th acoustic signal and a 2N−1th low frequency range signal that is a low frequency range signal of the 2N−1th acoustic signal, and a 2N-th low frequency range signal that is a low frequency range signal of the 2N-th acoustic signal. More specifically, an n-th band division unit 312 (n=1, . . . , N) receives, as input, a 2n−1th acoustic signal and a 2n-th acoustic signal, generates a 2n−1th high frequency range signal that is a high frequency range signal of the 2n−1th acoustic signal and a 2n−1th low frequency range signal that is a low frequency range signal of the 2n−1th acoustic signal, generates a 2n-th low frequency range signal that is a low frequency range signal of the 2n-th acoustic signal, and outputs the 2n−1th high frequency range signal, the 2n−1th low frequency range signal, and the 2n-th low frequency range signal.

The speaker system 320 receives, as input, the first high frequency range signal, the first low frequency range signal, the second low frequency range signal, . . . , the 2N−1th high frequency range signal, the 2N−1th low frequency range signal, and the 2N-th low frequency range signal output from the band division device 310, and emits a first high frequency range signal-based sound, a first low frequency range signal-based sound, a second low frequency range signal-based sound, . . . , a 2N−1th high frequency range signal-based sound, a 2N−1th low frequency range signal-based sound, and a 2N-th low frequency range signal-based sound. More specifically, the n-th speaker unit pair 322 (n=1, . . . , N) receives, as input, the 2n−1th high frequency range signal, the 2n−1th low frequency range signal, and the 2n-th low frequency range signal, emits a 2n−1th high frequency range signal-based sound from the tweeter 3221, emits a 2n−1th low frequency range signal-based sound from the positive speaker unit 1221, and emits a 2n-th low frequency range signal-based sound from the negative speaker unit 1222.

According to the embodiment of the present invention, it is possible to reproduce a sound that can be heard only in a very limited narrow range such as the vicinity of the speaker system.

Sixth Embodiment

The acoustic system 104 of the third embodiment is a system in which a sound in a high frequency range is less likely to leak by using the speaker unit 1221 to which the tweeter 1224 is attached. Here, an acoustic system in which a sound in a high frequency range is less likely to leak by using a sound absorbing member instead of using a speaker unit to which a tweeter is attached will be described.

Figure 20:
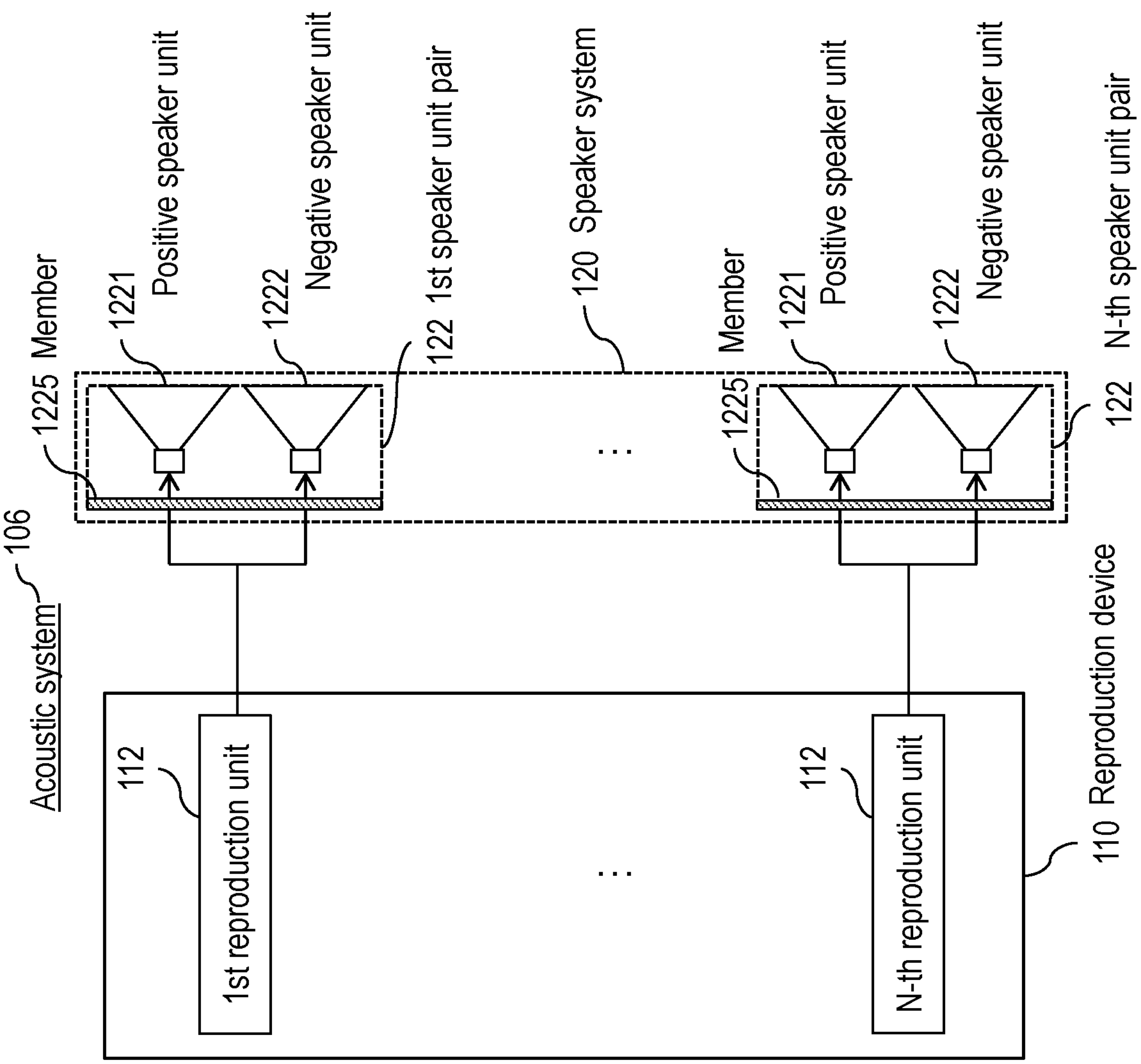
FIG. 20 is a block diagram illustrating an example of a configuration of an acoustic system 106.

Hereinafter, the acoustic system 106 will be described with reference to FIG. 20. FIG. 20 is a block diagram illustrating a configuration of the acoustic system 106. As illustrated in FIG. 20, similarly to the acoustic system 104, the acoustic system 106 includes the reproduction device 110 and the speaker system 120. However, the acoustic system 106 differs from the acoustic system 104 in that the speaker unit 1221 to which the tweeter 1224 is not attached is used instead of the speaker unit 1221 to which the tweeter 1224 is attached, and the member 1225 is attached to the speaker unit pair 122.

Hereinafter, the structure of an n-th speaker unit pair 122 (n=1, . . . , N) will be described with reference to FIG. 20.

Figure 21:
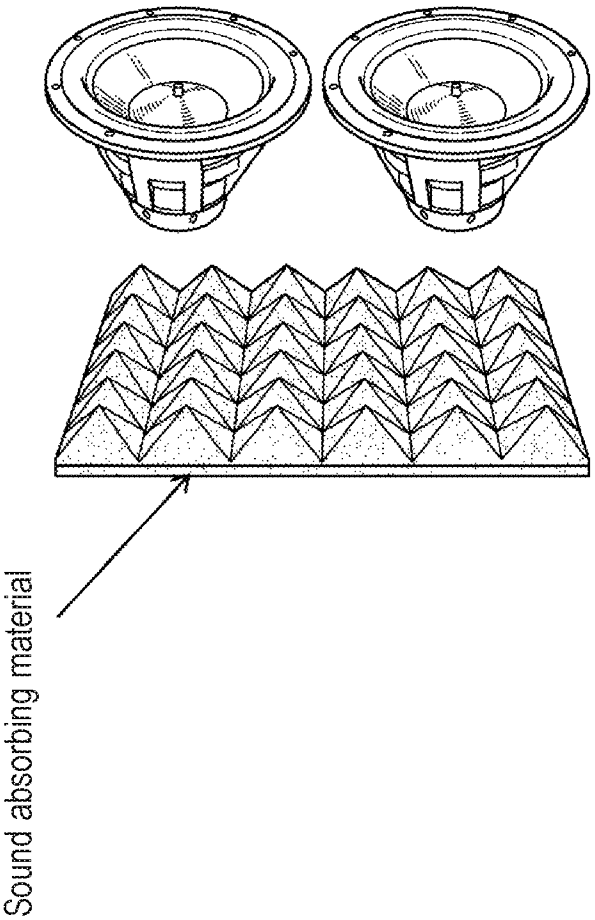
FIG. 21 is a diagram illustrating an example of a configuration of a speaker unit pair 122 to which a member 1225 is attached.

The member 1225 for absorbing a sound emitted from the positive speaker unit 1221 and the negative speaker unit 1222 of the n-th speaker unit pair 122 in the direction opposite to the n-th user direction is attached to the n-th speaker unit pair 122 (see FIG. 21). The member 1225 may be any member as long as it can prevent the emission of a sound in a high frequency range from the back. Note that, instead of installing the member 1225 only on the back of the speaker unit pair 122, the member 1225 may be installed so as to surround other than the front of the speaker unit pair 122.

According to the embodiment of the present invention, it is possible to reproduce a sound that can be heard only in a very limited narrow range such as the vicinity of the speaker system.

Seventh Embodiment

The acoustic system 106 of the sixth embodiment is a system in which a sound in a high frequency range is less likely to leak by using the speaker unit 1221 to which the member 1225 is attached. Here, an acoustic system will be described in which each speaker unit of a speaker unit pair is housed in a speaker box with holes instead of using a speaker unit pair to which a sound absorbing material is attached, so that a sound in a high frequency range is less likely to leak.

Figure 22:
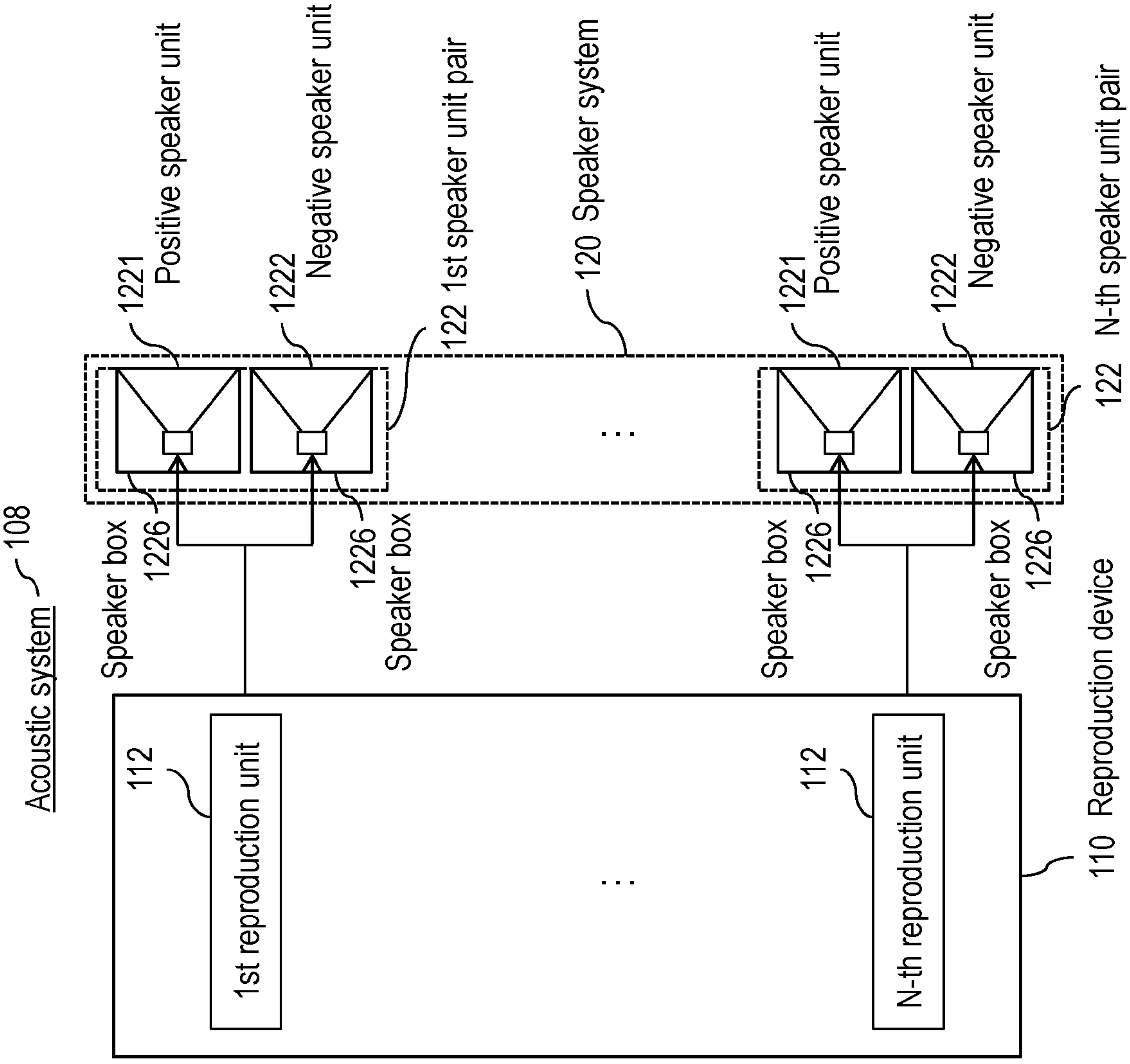
FIG. 22 is a block diagram illustrating an example of a configuration of an acoustic system 108.

Hereinafter, the acoustic system 108 will be described with reference to FIG. 22. FIG. 22 is a block diagram illustrating a configuration of the acoustic system 108. As illustrated in FIG. 22, similarly to the acoustic system 106, the acoustic system 108 includes the reproduction device 110 and the speaker system 120. The acoustic system 108 differs from the acoustic system 106 in that it includes a speaker unit pair 122 that includes a speaker unit 1221 housed in a speaker box 1226 instead of the speaker unit pair 122 to which the member 1225 is attached.

Hereinafter, the structure of an n-th speaker unit pair 122 (n=1, . . . , N) will be described with reference to FIG. 22.

Both the positive speaker unit 1221 and the negative speaker unit 1222 of the n-th speaker unit pair 122 are housed in the speaker box 1226. Note that the speaker box 1226 has a large number of holes.

According to the embodiment of the present invention, it is possible to reproduce a sound that can be heard only in a very limited narrow range such as the vicinity of the speaker system.

Note that, in the above-described embodiments, the speaker system including the speaker unit pair including one positive speaker unit and one negative speaker unit has been described, but the speaker unit pair (hereinafter, also referred to as a "set of speakers" or a "set of speaker units") can be a set including three or more speaker units, and may be installed such that acoustic signals emitted from the speaker units belonging to the set constitute a plurality of hearable regions. That is, with one set of speaker units, for example, three speaker units may constitute two hearable regions corresponding respectively to the left and right ears of one user, or four or five speaker units may constitute three or four hearable regions corresponding respectively to the left and right ears of two users.

Example 1

Example 1 of the present invention is an example in which each of the above-described embodiments is mounted on a digital signage. The digital signage is an advertisement medium that is installed in a place where an unspecified number of people come and go, such as a store or a facility, and electronically reproduces content including video and audio. The digital signage is often installed on a wall surface of a passage or a side of a quadrangular prism, a column, or the like.

Figure 23:
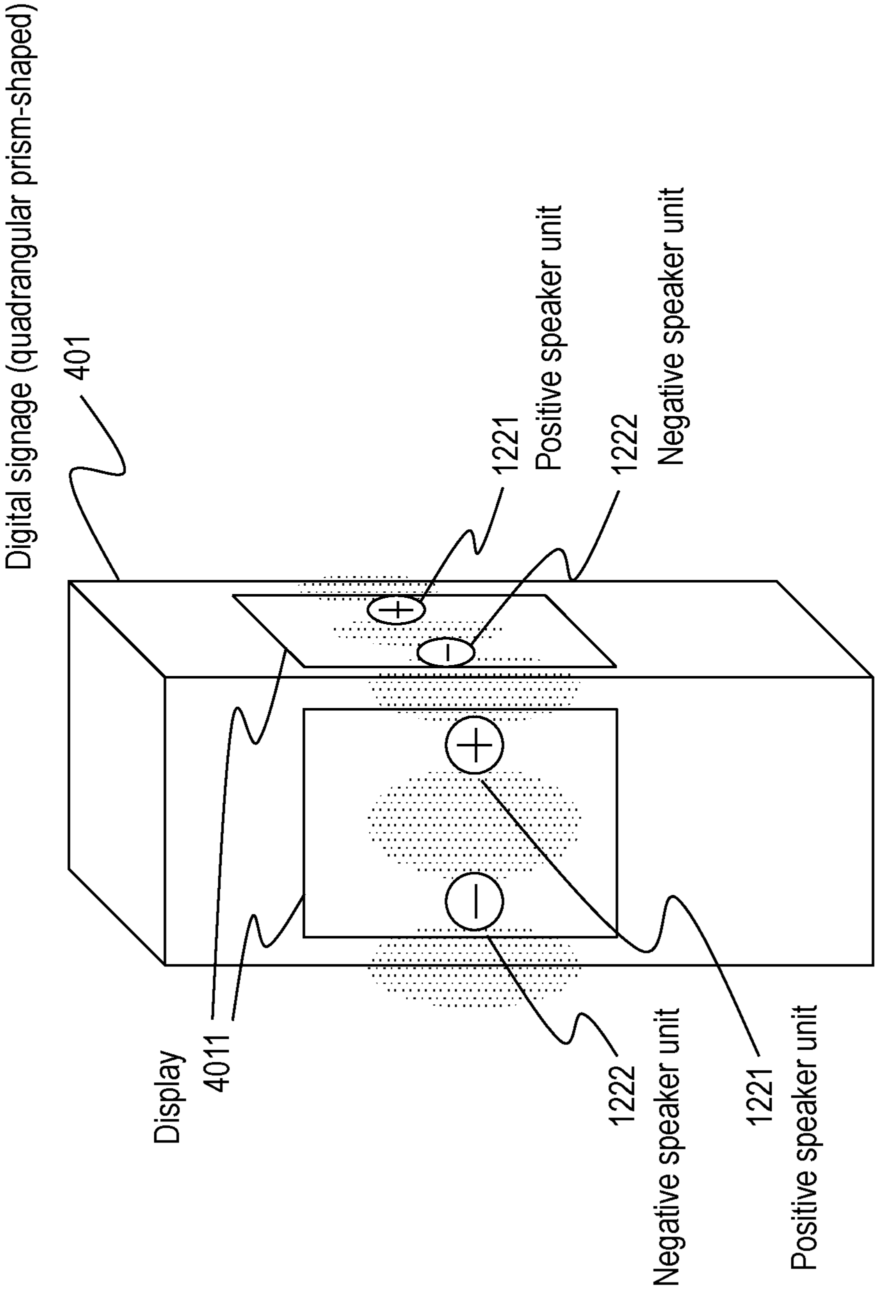
FIG. 23 is a diagram illustrating an example in which the acoustic system is mounted on a quadrangular prism digital signage.

FIG. 23 illustrates an example in which the acoustic system of each embodiment is mounted on a quadrangular prism-shaped digital signage. In the example of FIG. 23, one display 4011 is installed on each side of a quadrangular prism-shaped digital signage 401, and one set of the positive speaker unit 1221 and the negative speaker unit 1222 is installed for each display 4011. The positive speaker unit 1221 and the negative speaker unit 1222 installed on one side are arranged at symmetrical positions across the center line in the vertical direction of the display 4011 installed on the side. The silencing effect is improved when the positive speaker unit 1221 and the negative speaker unit 1222 are arranged as close as possible, but it is sufficient if an interval between the positive speaker unit 1221 and the negative speaker unit 1222 is designed according to the distance from the speaker to the assumed audible position (for example, the user's ear) and the path through which a diffracted sound passes. The positive speaker unit 1221 and the negative speaker unit 1222 must not be sealed so that a diffracted sound goes around in the direction of the user viewing and listening to the content.

Figure 24:
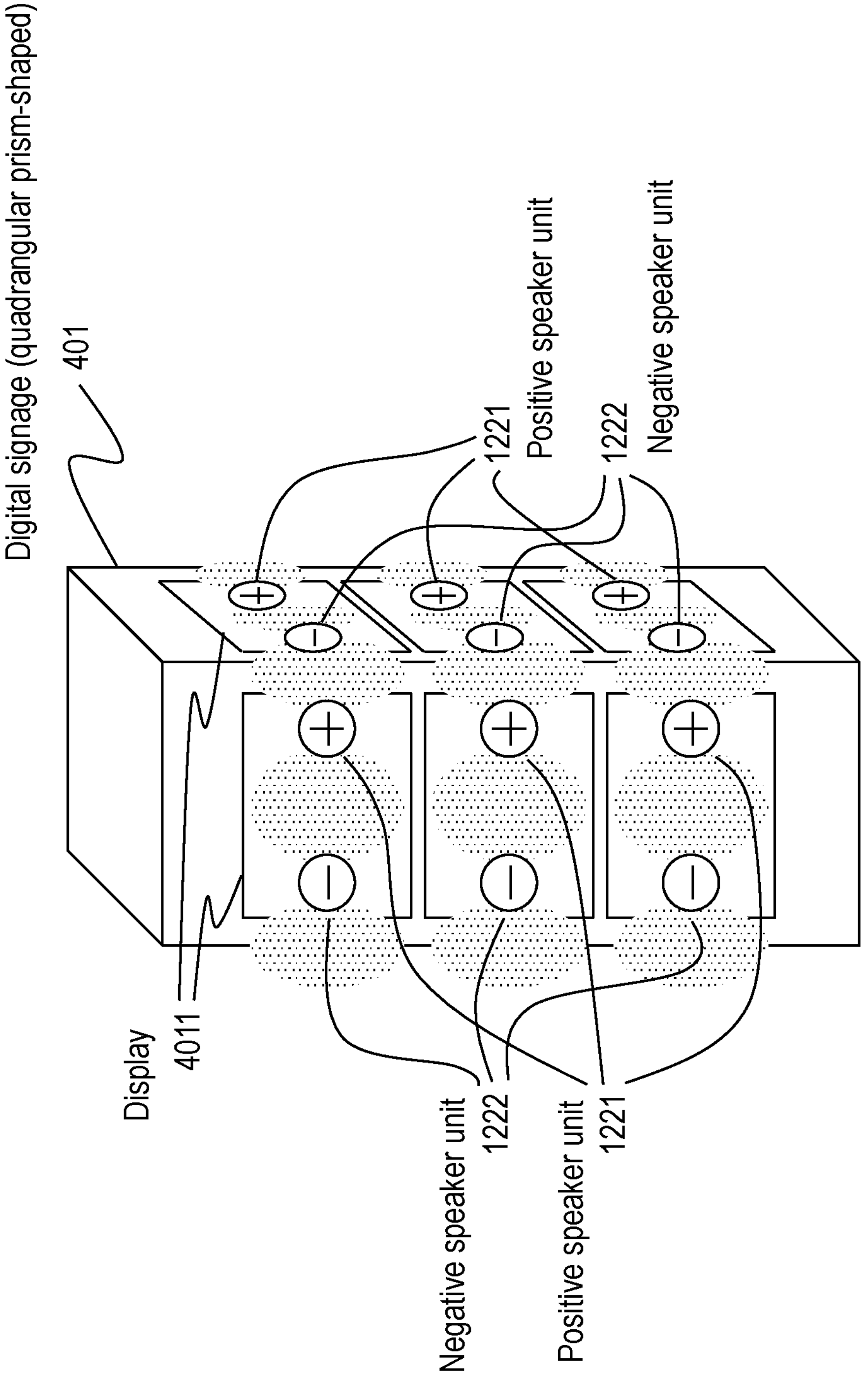
FIG. 24 is a diagram illustrating an example in which the acoustic system is mounted on a quadrangular prism digital signage.

FIG. 24 illustrates another example in which the acoustic system of each embodiment is mounted on a quadrangular prism-shaped digital signage. In the example of FIG. 24, three displays 4011 are installed at different heights on each side of a quadrangular prism-shaped digital signage 401, and one set of the positive speaker unit 1221 and the negative speaker unit 1222 is installed for each display 4011. In this case, different acoustic signals may be emitted for each set of speaker units installed at different heights. For example, a video signal related to content for adults is output to the display 4011 installed at a relatively high position, and an acoustic signal related to content for adults is emitted from a set of speaker units corresponding to the display 4011. In addition, a video signal related to content for children is output to the display 4011 installed at a relatively low position, and an acoustic signal related to content for children is emitted from a set of speaker units corresponding to the display 4011.

Figure 25:
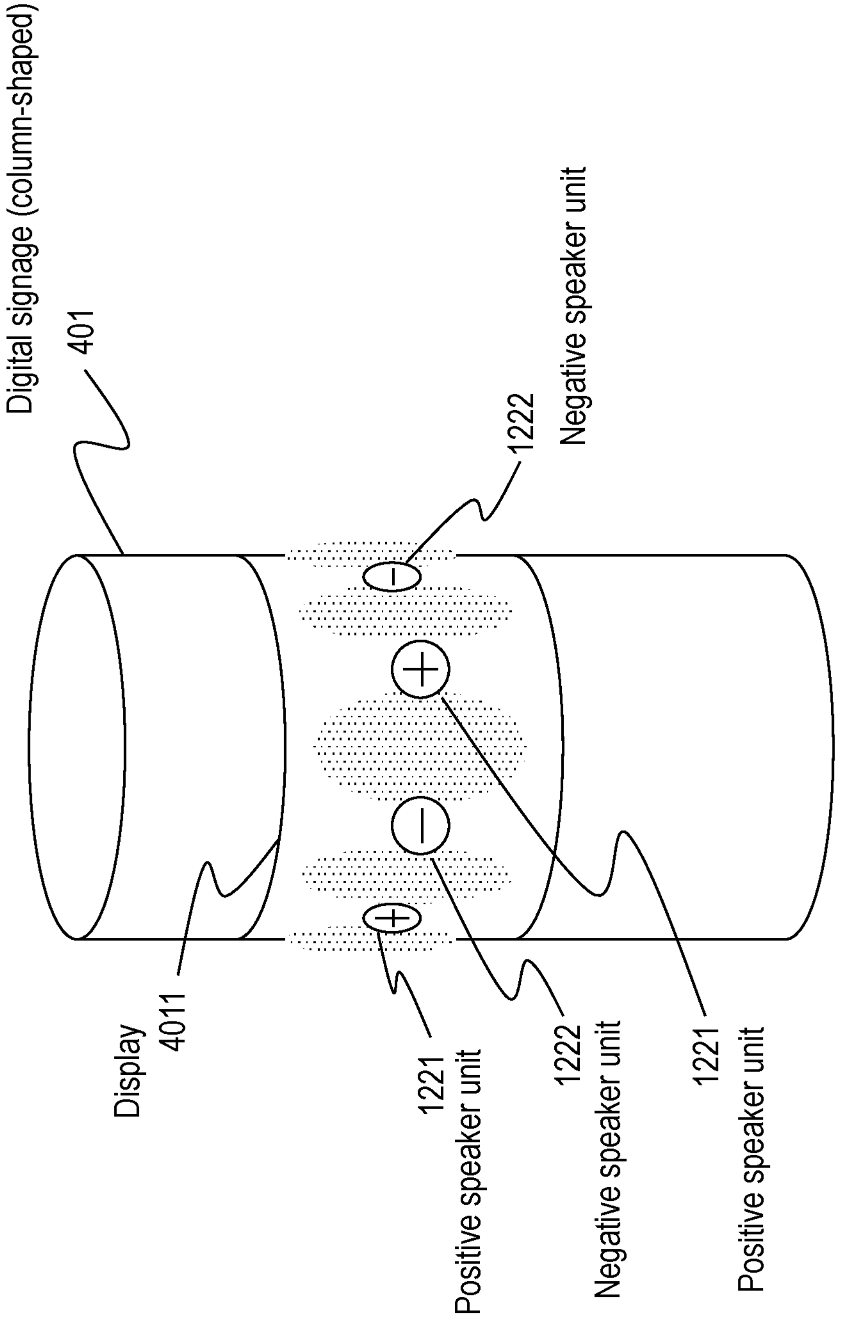
FIG. 25 is a diagram illustrating an example in which the acoustic system is mounted on a column digital signage.

FIG. 25 illustrates an example in which the acoustic system of each embodiment is mounted on a column-shaped digital signage. In the example of FIG. 25, one display 4011 is installed to cover the side of the column-shaped digital signage 401, and a set of one or more positive speaker units 1221 and one or more negative speaker units 1222 is installed for the display 4011. The positive speaker units 1221 and the negative speaker units 1222 are arranged alternately at equal intervals at the same height. In this case, the positive speaker units 1221 and the negative speaker units 1222 are arranged in the same number.

Figure 26:
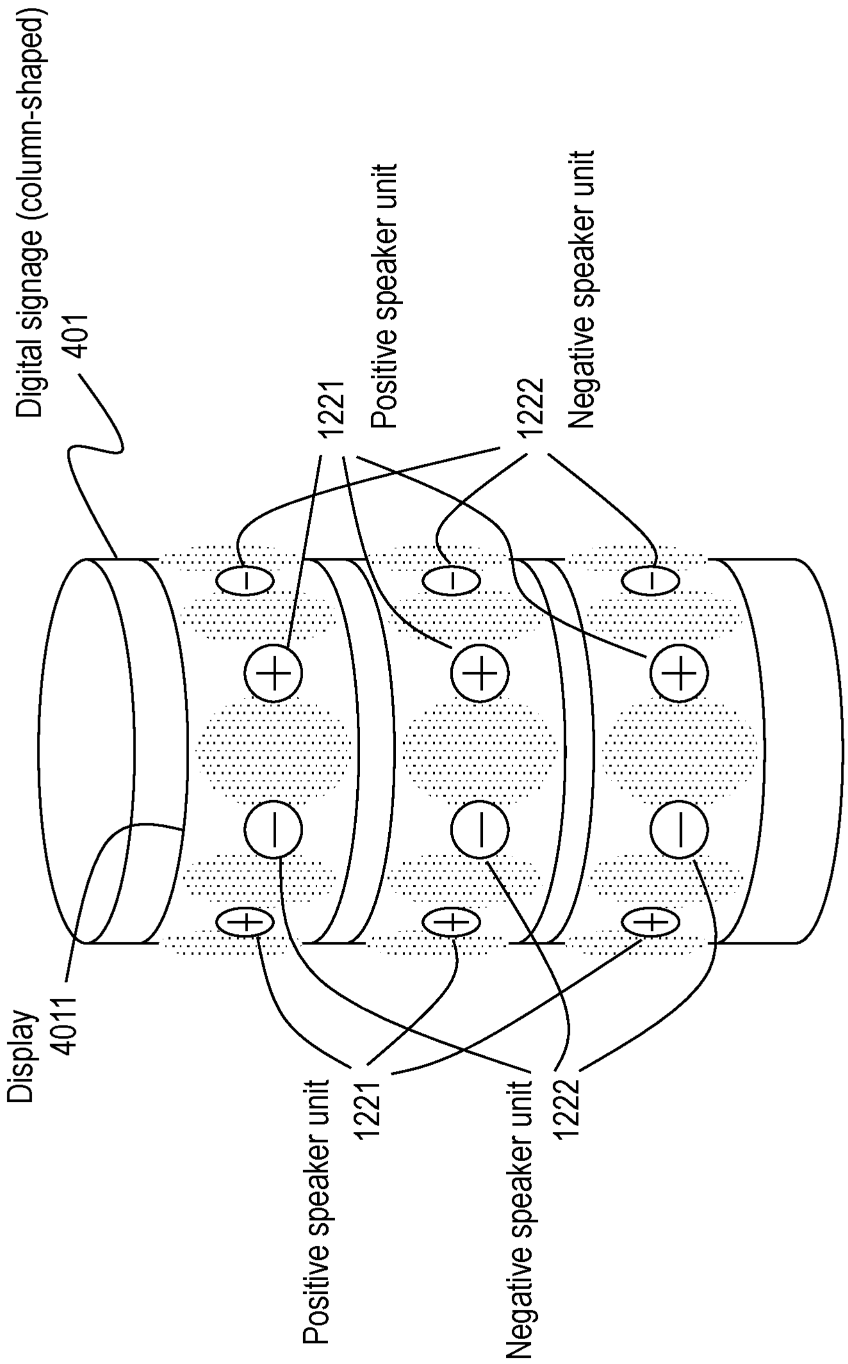
FIG. 26 is a diagram illustrating an example in which the acoustic system is mounted on a column digital signage.

FIG. 26 illustrates another example in which the acoustic system of each embodiment is mounted on a column-shaped digital signage. In the example of FIG. 26, three displays 4011 are installed at different heights to cover the side of a column-shaped digital signage 401, and a set of one or more positive speaker units 1221 and one or more negative speaker units 1222 is installed for each display 4011. In this case, as in another example of mounting on the quadrangular prism digital signage illustrated in FIG. 24, different acoustic signals may be emitted for each set of speaker units installed at different heights.

In Example 1, the examples in which each of the above-described embodiments is mounted on the digital signage have been described, but a conventional advertisement medium such as a poster may be used instead of a display of a digital signage, and may be combined with the acoustic system of each embodiment.

Example 2

Figure 27:
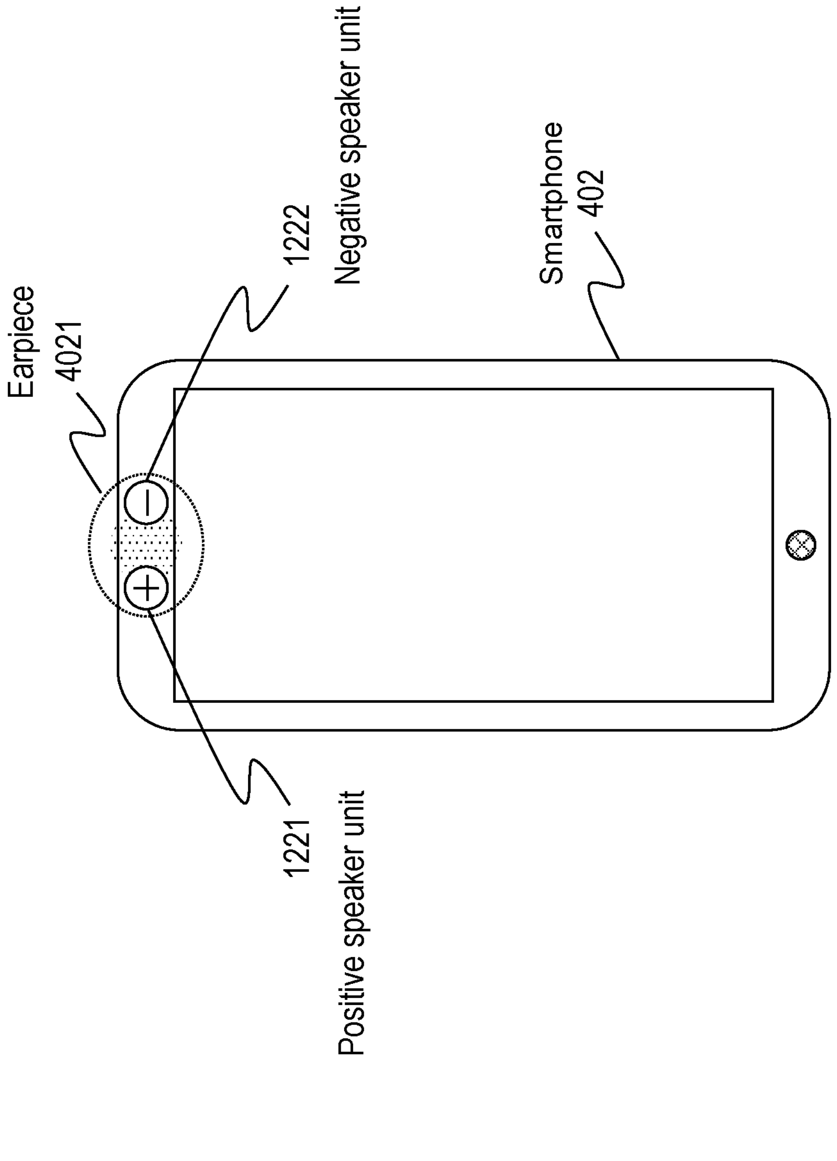
FIG. 27 is a diagram illustrating an example in which the acoustic system is mounted on one smartphone.

Example 2 of the present invention is an example in which each of the above-described embodiments is mounted on a smartphone. FIG. 27 illustrates an example in which the acoustic system of each embodiment is mounted on one smartphone. In the example of FIG. 27, the positive speaker unit 1221 and the negative speaker unit 1222 are arranged at the position of an earpiece 4021 of a smartphone 402. Also in this example, it is sufficient if the interval between the positive speaker unit 1221 and the negative speaker unit 1222 is designed according to the distance to the assumed audible position and the path through which a diffracted sound passes. In addition, the positive speaker unit 1221 and the negative speaker unit 1222 must not be sealed so that a diffracted sound goes around in the direction of an opening of the earpiece. By mounting the acoustic system of each embodiment on a smartphone, even when the earpiece volume is increased, the surroundings cannot hear the earpiece sound, and the earpiece sound can be heard only by the user.

In a case where it is desired to cause surrounding people to intentionally hear the reception sound like a speaker phone, it is only required to perform control so that the acoustic signal emitted from the positive speaker unit 1221 and the acoustic signal emitted from the negative speaker unit 1222 do not have opposite phases. For example, it is conceivable to stop only the sound emission from the negative speaker unit 1222 or to match the phase of the acoustic signal emitted from the negative speaker unit 1222 with the phase of the acoustic signal emitted from the positive speaker unit 1221.

Figure 28:
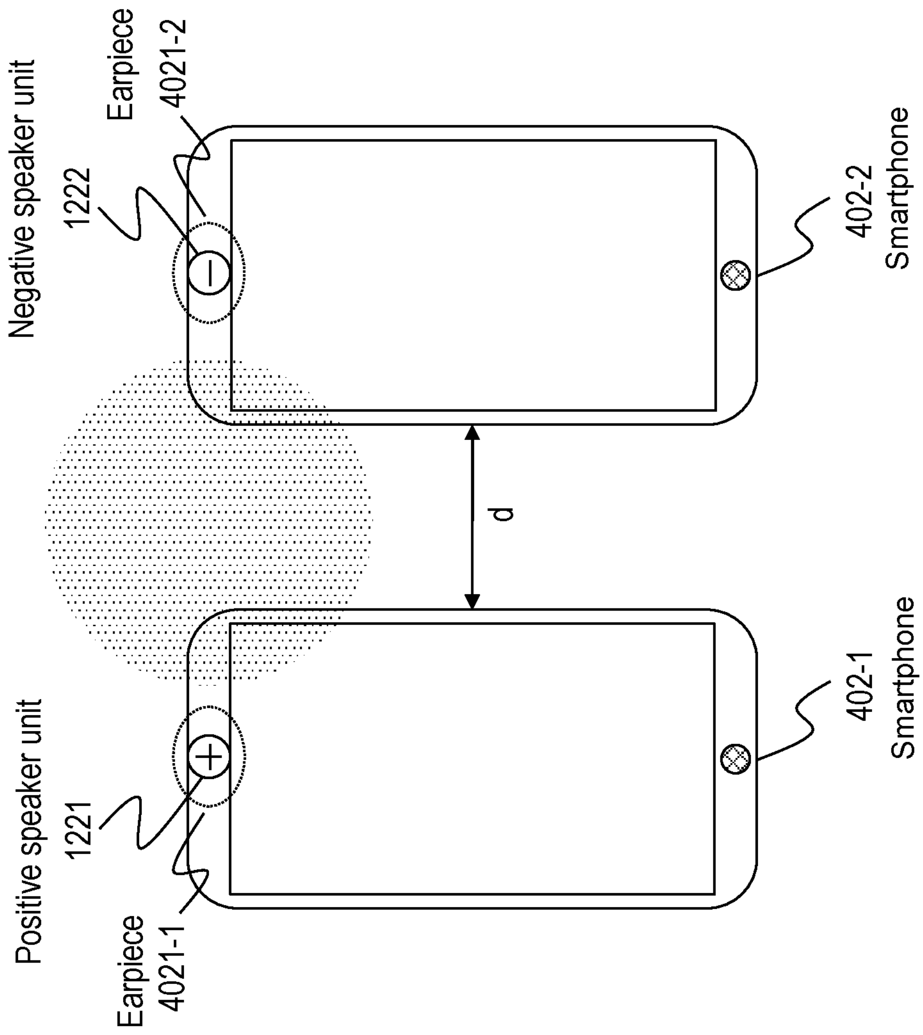
FIG. 28 is a diagram illustrating an example in which the acoustic system is mounted on two smartphones.

FIG. 28 illustrates an example in which the acoustic system of each embodiment is mounted on two smartphones. In the example of FIG. 28, the positive speaker unit 1221 is arranged at the position of an earpiece 4021-1 of a first smartphone 402-1, and the negative speaker unit 1222 is arranged at the position of an earpiece 4021-2 of a second smartphone 402-2. The narrower an interval d between the first smartphone 402-1 and the second smartphone 402-2, the narrower an audible region, and the wider the interval d, the wider the audible region. In particular, the higher the frequency is, the more the silencing effect is reduced due to the influence of spatial aliasing, and therefore, the wider the interval d between the smartphones 402 is, the more easily a high pitch sound can be heard. The reproduction device 110 that generates an acoustic signal emitted from each speaker unit may be mounted in the first smartphone 402-1, may be mounted in the second smartphone 402-2, may be implemented by communication between modules installed in the smartphones 402, or may be implemented as an external device different from any of the smartphones 402.

In Example 2, the example has been described in which the acoustic system of each embodiment is mounted on a smartphone, but the acoustic system can be similarly mounted on any equipment that is held by a user's hand and used for a call or listening to an acoustic signal. Examples of such equipment include a tablet terminal and a laptop computer. In addition, it may be similarly mounted on equipment that is not held by a user's hand but placed on a desk, the ground, or the like to make a call or the like. That is, it may be mounted as in Example 2 on any equipment the position of which can be moved by the user.

When the acoustic system of each embodiment is mounted and used on a mobile terminal such as a tablet terminal or a laptop computer, the acoustic system may be implemented using a speaker mounted on the mobile terminal itself or may be implemented using an external speaker. In the case of implementation using an external speaker, for example, the external speaker may be fixed to the mobile terminal. With reference to the user operating the mobile terminal, the speaker may be fixed in any way, such as only to the right side, only to the left side, or to the top of the display.

Example 3

Figure 29:
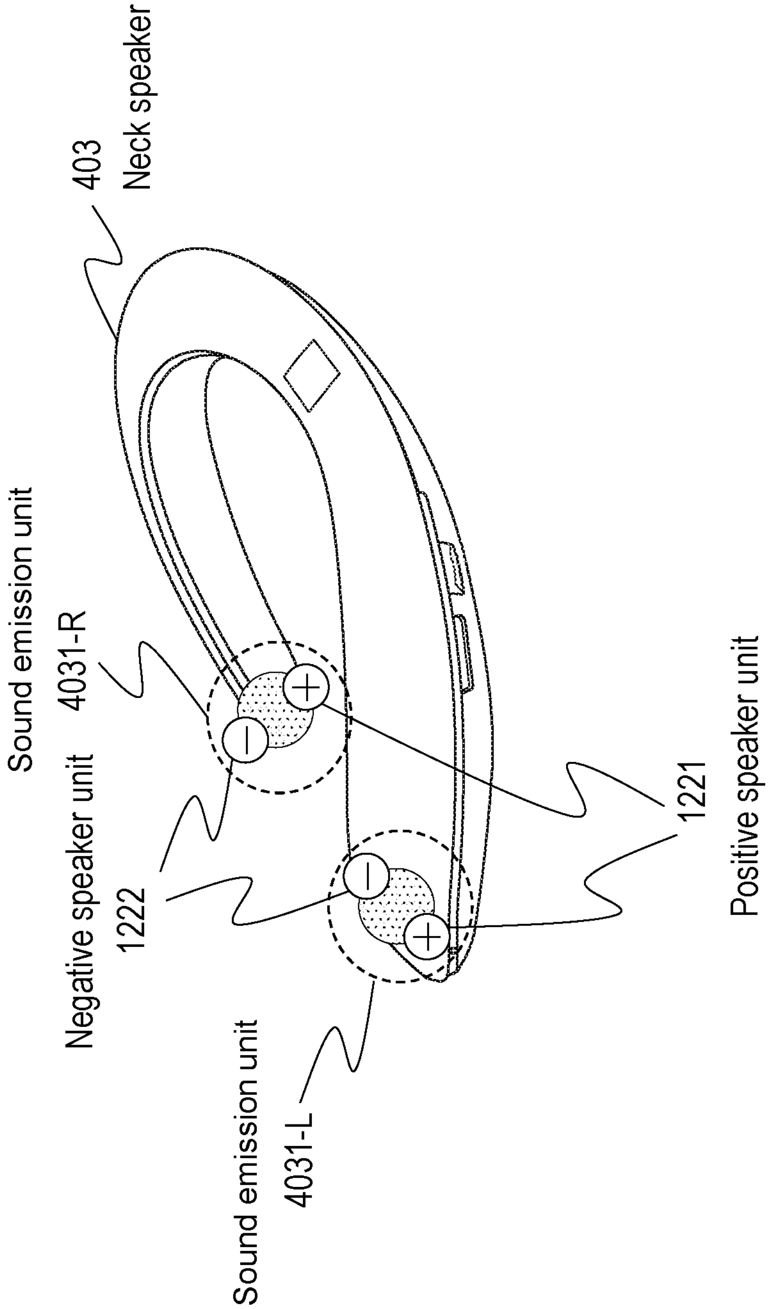
FIG. 29 is a diagram illustrating an example in which the acoustic system is mounted on a neck speaker.

Example 3 of the present invention is an example in which each of the above-described embodiments is mounted on a neck speaker. The neck speaker is a sound emission device held by the neck or head of a human, and a sound emission unit is not directly worn on the user's ear. FIG. 29 illustrates an example in which the acoustic system of each embodiment is mounted on a neck speaker. In the example of FIG. 29, one set of the positive speaker unit 1221 and the negative speaker unit 1222 is arranged in each of left and right sound emission units 4031-L and 4031-R of a neck speaker 403. Also in this example, it is sufficient if the interval between the positive speaker unit 1221 and the negative speaker unit 1222 is designed according to the distance to the assumed audible position and the path through which a diffracted sound passes. In addition, the positive speaker unit 1221 and the negative speaker unit 1222 must not be sealed so that a diffracted sound goes around in the direction of an opening of the sound emission units. By mounting the acoustic system of each embodiment on a neck speaker, even when the reproduced sound volume is increased, the surroundings cannot hear the reproduced sound, and the reproduced sound can be heard only by the user.

Figure 30:
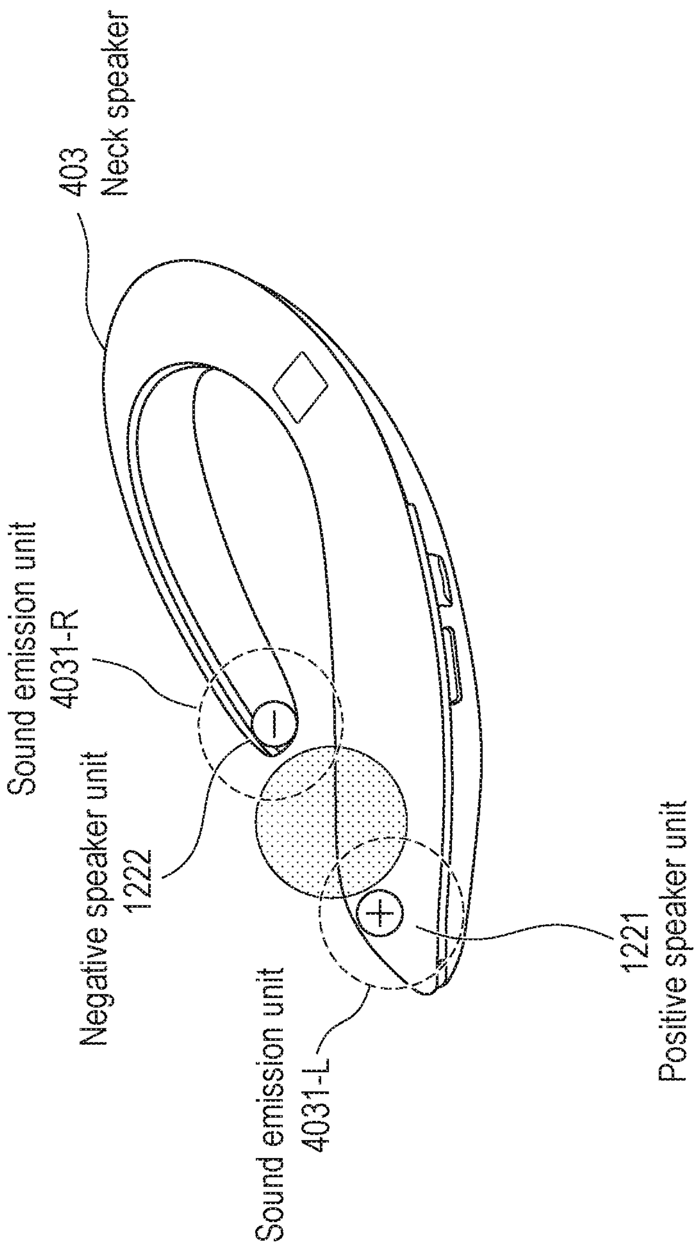
FIG. 30 is a diagram illustrating an example in which the acoustic system is mounted on a neck speaker.

The example of FIG. 29 is a configuration capable of stereo reproduction by limiting the audible region by each of the left and right sound emission units. If it is only required to support monaural reproduction, as illustrated in FIG. 30, for example, it is sufficient if only the positive speaker unit 1221 is arranged in the left-side sound emission unit 4031-L and only the negative speaker unit 1222 is arranged in the right-side sound emission unit 4031-R (alternatively, only the negative speaker unit 1222 in the left-side sound emission unit 4031-L and only the positive speaker unit 1221 in the right-side sound emission unit 4031-R).

Here, the example of mounting on the neck speaker has been described, but it can be similarly mounted on any equipment that is held by a user's neck or head for listening to an acoustic signal. Examples of such equipment include a release-type headset.

Example 4

Figure 31:
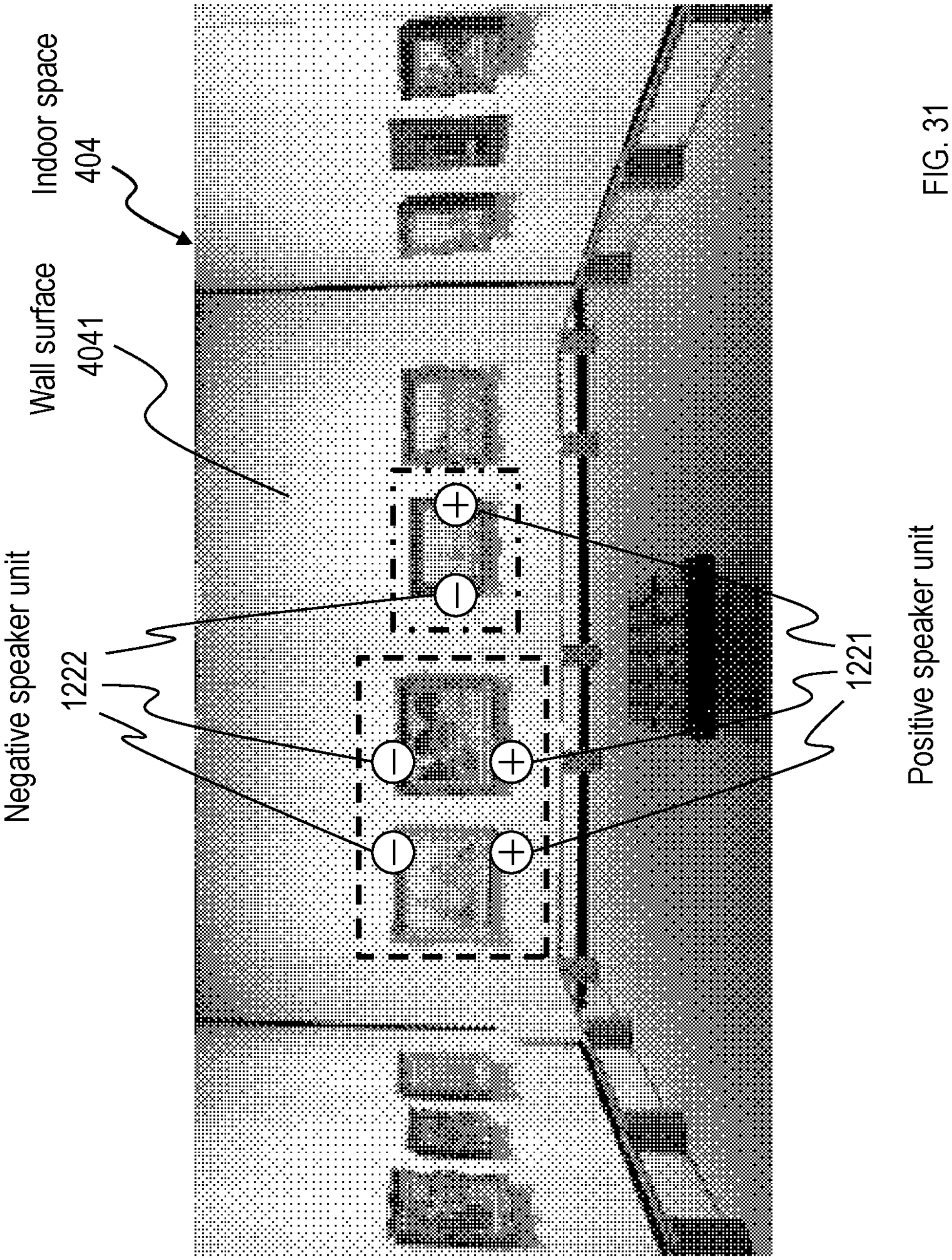
FIG. 31 is a diagram illustrating an example in which the acoustic system is mounted on a wall surface of an indoor space.

Example 4 of the present invention is an example in which each of the above-described embodiments is mounted on a wall surface of an indoor space or an outdoor space. Here, it is assumed that voice guidance for describing an exhibit is emitted in an exhibit room in a museum so as to be heard only around the exhibit. FIG. 31 illustrates an example in which the acoustic system of each embodiment is mounted on a wall surface of an indoor space. In the example of FIG. 31, one set of the positive speaker unit 1221 and the negative speaker unit 1222 is arranged in each of a plurality of exhibit spaces set on a wall surface 4041 of an indoor space 404. Each set of speaker units is configured to emit an acoustic signal reading out the description of the corresponding exhibit. Also in this example, it is sufficient if the interval between the positive speaker unit 1221 and the negative speaker unit 1222 is designed according to the distance to the assumed audible position and the path through which a diffracted sound passes. In addition, the positive speaker unit 1221 and the negative speaker unit 1222 must not be sealed so that a diffracted sound goes around in the direction of the user listening to the voice guidance of the exhibit. By mounting the acoustic system of each embodiment on the wall surface of the indoor space or the outdoor space, even when the reproduced sound volume is increased, the voice guidance of each exhibit cannot be heard by viewers of other exhibits, and only the viewer of the exhibit can listen to the voice guidance.

The positive speaker unit 1221 and the negative speaker unit 1222 may be arranged side by side in a horizontal direction as in a set of speaker units indicated by the one-dot chain line, or may be arranged side by side in a vertical direction as in a set of speaker units indicated by the broken line. In the case of arranging side by side in the vertical direction, even in a case where the interval between the exhibits is narrow, it is possible to clearly listen to the voice guidance for each exhibit without mixing.

Example 5

Figure 32:
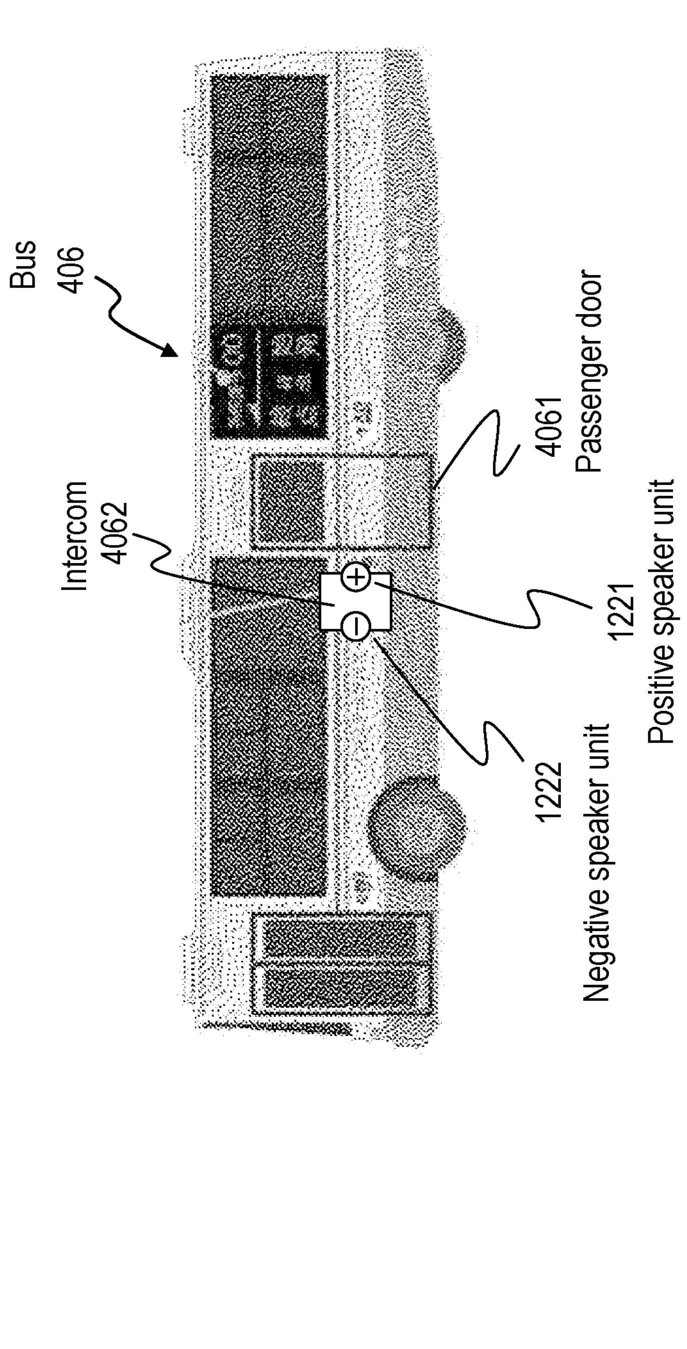
FIG. 32 is a diagram illustrating an example in which the acoustic system is mounted on an intercom of a bus.

Example 5 of the present invention is an example in which each of the above-described embodiments is mounted on an intercom. Here, an intercom installed on a wall surface in the vicinity of an entrance of a bus and used for interaction between a driver and a passenger is assumed. FIG. 32 illustrates an example in which the acoustic system of each embodiment is mounted on an intercom of a bus. In the example of FIG. 32, a set of the positive speaker unit 1221 and the negative speaker unit 1222 is arranged in an intercom 4062 of a bus 406. Also in this example, it is sufficient if the interval between the positive speaker unit 1221 and the negative speaker unit 1222 is designed according to the distance to the assumed audible position and the path through which a diffracted sound passes. In addition, the positive speaker unit 1221 and the negative speaker unit 1222 must not be sealed so that a diffracted sound goes around in the direction of the user talking on the intercom. By mounting the acoustic system of each embodiment on the intercom of the bus, even when the reproduced sound volume is increased, the voice of the driver cannot be heard by other passengers, and only the passenger interacting with the driver can listen to the voice of the driver.

In the intercom of the bus, there is a case where it is sufficient if only a passenger interacting with the driver on a one-to-one basis hears the driver's voice, or there is a case where the driver wants to make an announcement to a plurality of passengers waiting at a bus stop. In a case where an announcement is to be made to a plurality of passengers, as described in Example 2, it is only required to perform control so that the acoustic signal emitted from the positive speaker unit 1221 and the acoustic signal emitted from the negative speaker unit 1222 do not have opposite phases.

Example 6

Figure 33:
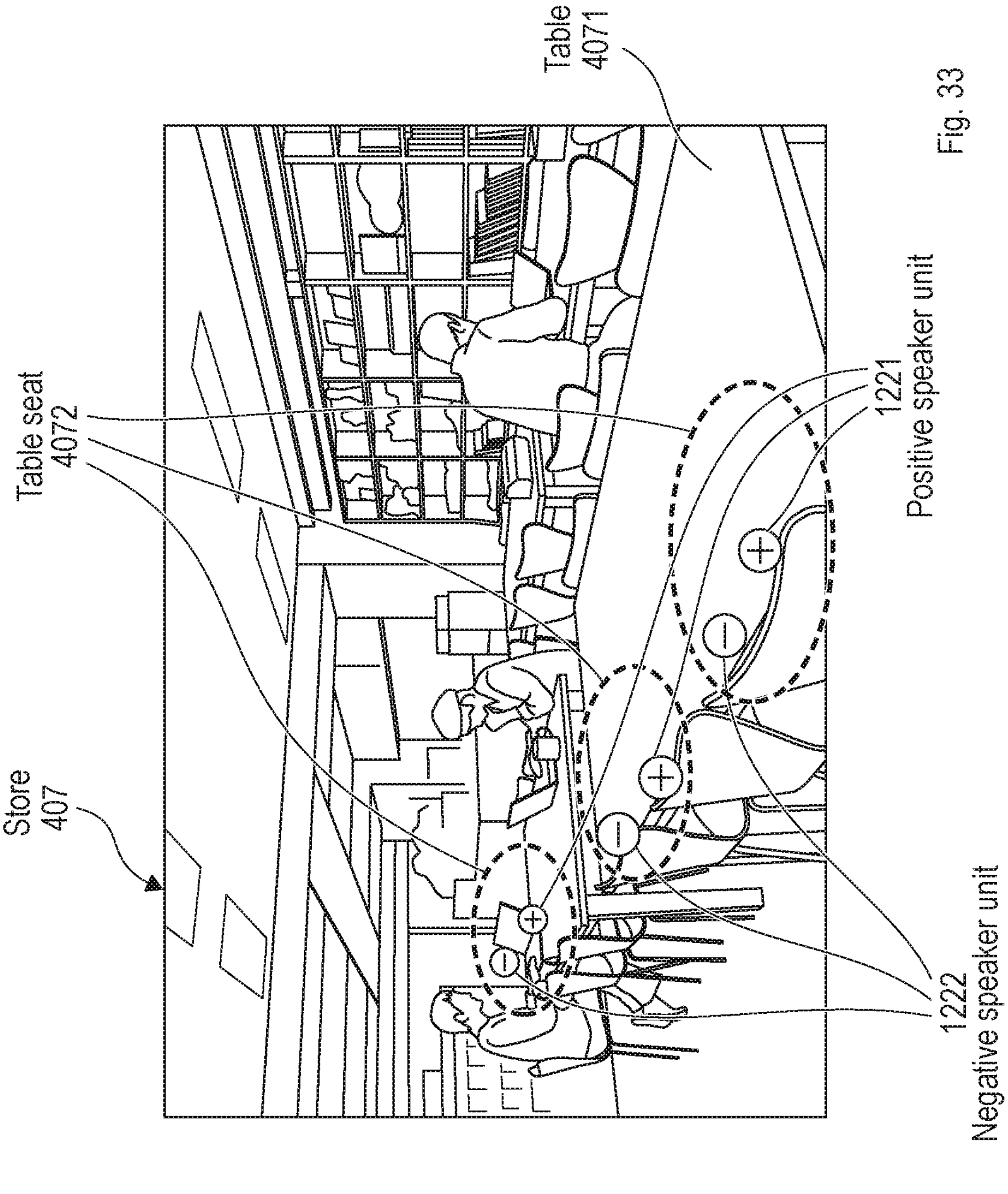
FIG. 33 is a diagram illustrating an example in which the acoustic system is mounted on a table seat of a store.

Example 6 of the present invention is an example in which each of the above-described embodiments is mounted on a table seat. Here, use in an environment in which a plurality of seats is set for one table, such as a library or a cafe, is assumed. FIG. 33 illustrates an example in which the acoustic system of each embodiment is mounted on a table seat installed in a store. In the example of FIG. 33, one set of the positive speaker unit 1221 and the negative speaker unit 1222 is arranged in each of a plurality of table seats 4072 set for a table 4071 installed in a store 407. Also in this example, it is sufficient if the interval between the positive speaker unit 1221 and the negative speaker unit 1222 is designed according to the distance to the assumed audible position and the path through which a diffracted sound passes. In addition, the positive speaker unit 1221 and the negative speaker unit 1222 must not be sealed so that a diffracted sound goes around in the direction in which the user of the table seat sits. By mounting the acoustic system of each embodiment on a table seat, even when the reproduced sound volume is increased, the reproduced sound cannot be heard by a user of another table seat, and the reproduced sound can be heard only by the user of the table seat.

Example 7

Figure 34:
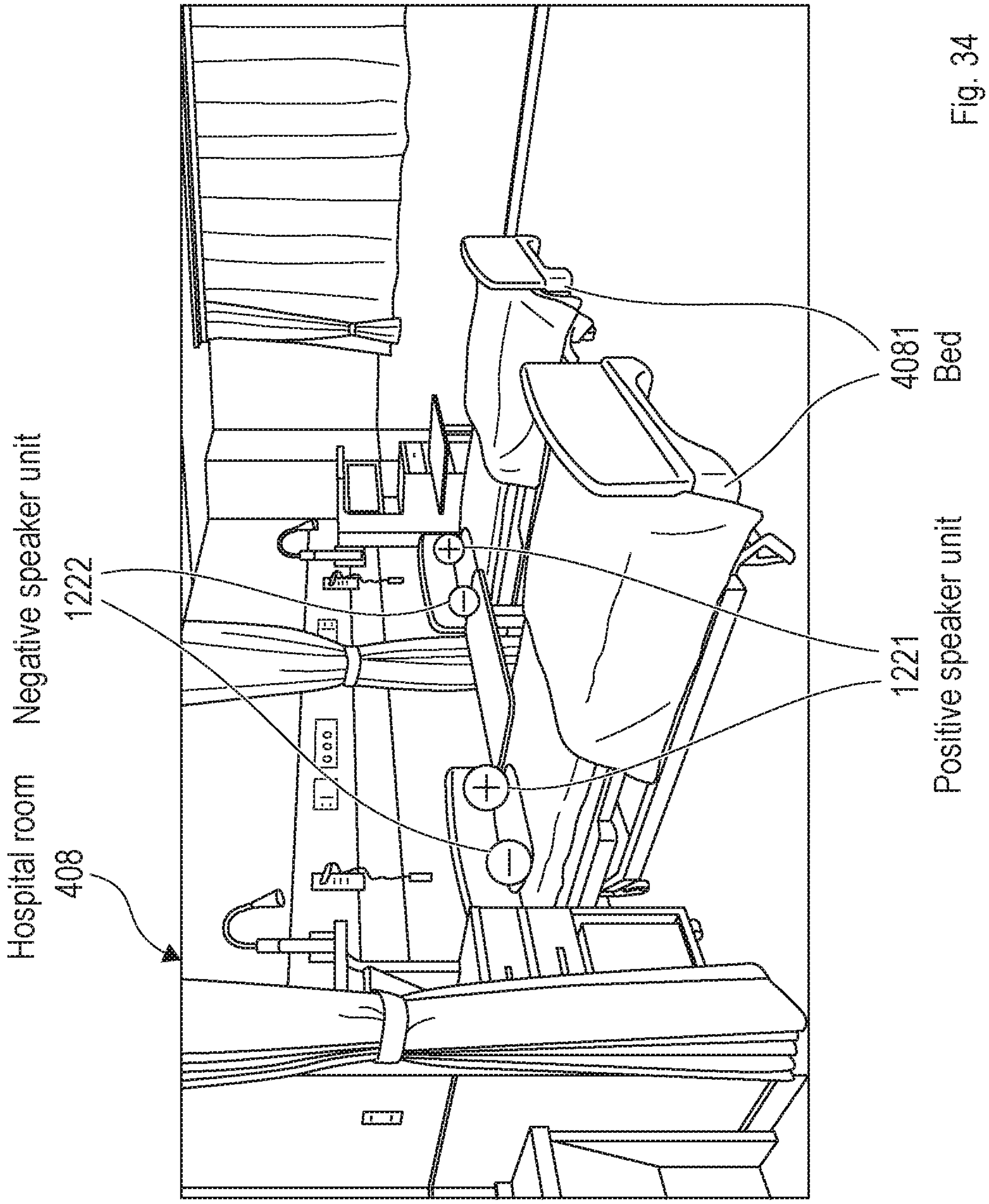
FIG. 34 is a diagram illustrating an example in which the acoustic system is mounted on a bed in a hospital room.

Example 7 of the present invention is an example in which each of the above-described embodiments is mounted on a bed. Here, use in an environment in which a plurality of beds is installed in one room, such as a hospital or a nursing care facility, is assumed. FIG. 34 illustrates an example in which the acoustic system of each embodiment is mounted on a bed installed in a hospital room. In the example of FIG. 34, one set of the positive speaker unit 1221 and the negative speaker unit 1222 is arranged in each of a plurality of beds 4081 installed in a hospital room 408. The positive speaker unit 1221 and the negative speaker unit are arranged in a portion where the head is located when a human lies on the bed 4081. Also in this example, it is sufficient if the interval between the positive speaker unit 1221 and the negative speaker unit 1222 is designed according to the distance to the assumed audible position and the path through which a diffracted sound passes. In addition, the positive speaker unit 1221 and the negative speaker unit 1222 must not be sealed so that a diffracted sound goes around in the direction in which the user of the bed is lying. By mounting the acoustic system of each embodiment on a bed, even when the reproduced sound volume is increased, the reproduced sound cannot be heard by a user of another bed, and the reproduced sound can be heard only by the user of the bed.

Example 8

Figure 35:
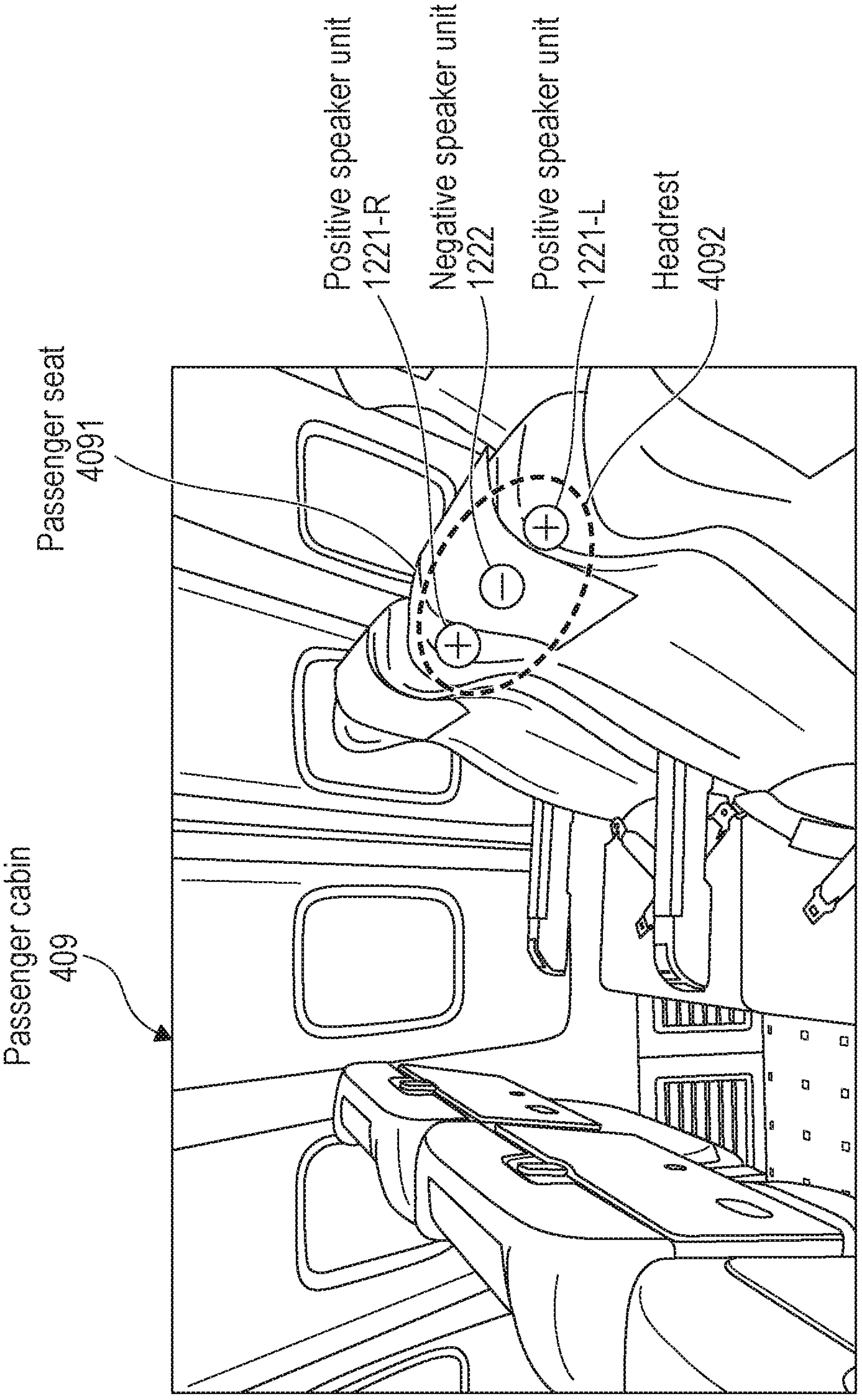
FIG. 35 is a diagram illustrating an example in which the acoustic system is mounted on a passenger seat of a passenger cabin.

Example 8 of the present invention is an example in which each of the above-described embodiments is mounted on a passenger seat of a passenger cabin. Here, use in an environment where a plurality of one-seater passenger seats is installed in one passenger cabin, such as an airplane or a railway vehicle, is assumed. In particular, use in a passenger seat in which the headrest is integrated with the backrest to have a flat shape is assumed. FIG. 35 illustrates an example in which the acoustic system of each embodiment is mounted on a passenger seat of a passenger cabin. In the example of FIG. 35, one set of two positive speaker units 1221-L and 1221-R and one negative speaker unit 1222 is arranged in each of a plurality of passenger seats 4091 installed in a passenger cabin 409. The positive speaker unit 1221-R is arranged in the vicinity of a right end of a headrest 4092 of the passenger seat 4091, the positive speaker unit 1221-L is arranged in the vicinity of a left end of the headrest 4092 of the passenger seat 4091, and the negative speaker unit 1222 is arranged in the vicinity of a center of the headrest 4092 of the passenger seat 4091. With this arrangement, when the passenger sits on the passenger seat 4091, the reproduced sound is configured such that it is audible in the regions where the left ear and the right ear of the passenger are located, and not audible in the other regions, and therefore, even when the reproduced sound volume is increased, the reproduced sound cannot be heard by passengers in the front, rear, left, and right passenger seats, and only the passenger in the passenger seat can hear the reproduced sound.

Example 9

Each of the above-described embodiments may be mounted on clothing worn by a human. For example, one set of the positive speaker unit 1221 and the negative speaker unit 1222 is arranged in each of the vicinity of a portion where the right ear is located (e.g., right shoulder or inside right side of hood) and the vicinity of a portion where the left ear is located (e.g., left shoulder or inside left side of hood) when a person wears clothing. As described in Example 3, only the positive speaker unit 1221 may be arranged on the right side, and only the negative speaker unit 1222 may be arranged on the left side (alternatively, only the negative speaker unit 1222 on the right side and only the positive speaker unit 1221 on the left side). For example, by mounting the acoustic system of each embodiment on clothing assumed to be used in a noisy environment such as work clothes and air conditioned clothes, the embodiments are also applicable to communication with a worker wearing the clothes while preventing hearing loss due to noise.

Other Examples

Above-described embodiments and examples deal with an acoustic signal reproduction, that is, a sound wave, but the present invention is also applicable to a radio wave or a light wave. For example, it can be used for short-range wireless communication such as Bluetooth (registered trademark). Specifically, when used in a smart key of an automobile and/or a reception unit of an automobile, vehicle theft by a method such as relay attack can be avoided.

In the above-described embodiments and examples, by increasing the size of each speaker unit, a configuration that enables hearing in a wider region is also possible. Specifically, the configuration is applicable to the case where there is a residential area in the direction of sound emission from a traffic light, an in-school announcement, or the like. In the case of an increase in size, a speaker unit pair that performs reproduction may be configured for each of high frequency, medium frequency, and low frequency. Since it is difficult to erase high frequencies, a sound absorbing material may physically surround the speaker unit so that an acoustic signal is emitted only to a region in which it is to be heard.

Supplement

The above description of the embodiments of the present invention has been presented for purposes of illustration and description. There is no intention to be exhaustive or to limit the invention to the precise form disclosed. Modifications and variations are possible from the above teaching. The embodiments have been chosen and represented in order to provide the best illustration of the principles of the present invention and to enable those skilled in the art to utilize the present invention in various embodiments and by adding various modifications to be suited for contemplated practical use. All such modifications and variations are within the scope of the present invention as defined by the appended claims, interpreted in accordance with a fairly and legally equitable breadth.

The invention claimed is:

1. A speaker system that emits an acoustic signal that is audible to one or more target users who are in the vicinity of the speaker system and not audible to a user outside the vicinity of the speaker system, the speaker system comprising:

at least two or more sets of speakers, each set of speakers of the at least two or more sets of speakers including a first speaker that emits the acoustic signal, and a second speaker that emits the acoustic signal in a phase opposite to the first speaker, wherein the first speaker and the second speaker are arranged such that sounds emitted from the speakers in a direction opposite to the one or more target users go around and propagate in a direction of the one or more target users, thereby emitting an acoustic signal that is audible to one or more target users who are in the vicinity of the speaker system and not audible to the user outside the vicinity of the speaker system, and the at least two or more sets of speakers are installed on a wall surface on which a digital signage display is installed.

2. The speaker system according to claim 1, wherein the wall surface comprises installation of the at least two or more sets of speakers including the set of speakers, and respective sets of speakers of the at least two or more sets of speakers installed on the wall surface are installed at different heights on the wall surface.

3. The speaker system according to claim 2, wherein each of the respective sets of speakers installed on the wall surface is configured to emit different acoustic signals.

4. The speaker system according to claim 3, wherein the at least two or more sets of speakers are installed on the wall surface with different height, a first set of speakers of the at least two or more sets of speakers installed at higher position is configured to emit an acoustic signal constituting content for adults, and a second set of speakers of the at least two or more sets of speakers installed at lower position is configured to emit an acoustic signal constituting content for children.

5. The speaker system according to claim 1, wherein the wall surface is a part of a plurality of wall surfaces, at least another wall surface of the plurality of wall surfaces comprises another installation of the digital signage display, and at least one set of speakers of the at least two or more sets of speakers is installed on a respective wall surface of the plurality of wall surfaces on which the digital signage display is installed.

* * * * *